(12) United States Patent
Dash et al.

(10) Patent No.: US 12,511,292 B2
(45) Date of Patent: Dec. 30, 2025

(54) CLUSTER VIEWS FOR COMPUTE SCALE AND CACHE PRESERVATION

(71) Applicant: Microsoft Technology Licensing, LLC, Redmond, WA (US)

(72) Inventors: Sumeet Priyadarshee Dash, Lake Forest, CA (US); Jose Aguilar Saborit, Bellevue, WA (US); Krishnan Srinivasan, Issaquah, WA (US); Wei Wang, Madison, WI (US); Mohammad Shafiei Khadem, Seattle, WA (US); Raghunath Ramakrishnan, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/475,010

(22) Filed: Sep. 26, 2023

(65) Prior Publication Data
US 2024/0394259 A1    Nov. 28, 2024

Related U.S. Application Data

(60) Provisional application No. 63/503,664, filed on May 22, 2023.

(51) Int. Cl.
*G06F 16/24* (2019.01)
*G06F 16/2455* (2019.01)

(52) U.S. Cl.
CPC .. *G06F 16/24552* (2019.01); *G06F 16/24553* (2019.01)

(58) Field of Classification Search
CPC .................. G06F 16/24552; G06F 16/24553
USPC ............................................................ 707/722
See application file for complete search history.

(56) References Cited

U.S. PATENT DOCUMENTS

| | | | |
|---|---|---|---|
| 6,934,699 B1 * | 8/2005 | Haas | G06F 16/24545 |
| 8,719,415 B1 * | 5/2014 | Sirota | G06F 9/5061 |
| | | | 709/221 |
| 8,996,563 B2 * | 3/2015 | Bender | G06F 16/217 |
| | | | 707/769 |
| 10,983,995 B2 | 4/2021 | Brown | |
| 11,573,927 B1 * | 2/2023 | Pearson | G06F 16/24552 |

(Continued)

OTHER PUBLICATIONS

International Search Report and Written Opinion received for PCT Application No. PCT/US2024/030136, Jul. 29, 2024, 11 pages.

*Primary Examiner* — Hicham Skhoun
(74) *Attorney, Agent, or Firm* — Weaver IP L.L.C.

(57) ABSTRACT

A distributed query processor in a server is configured for compute scale and cache preservation to enable efficient cluster usage for query processing. The query processor includes an operator analyzer and an operator scheduler. The operator analyzer determines a first operator, of a graph of operators representative of a user query, to have a first characteristic and assigns the first operator to a first node set of a plurality of node sets. The first node set is associated with the first characteristic. A second node set of the node sets is associated with a second characteristic different from the first characteristic. The operator scheduler is configured to cause the first operator to be executed in the assigned first node set to generate a first operator result, and a query result to be generated based at least on the first operator result.

20 Claims, 6 Drawing Sheets

(56) References Cited

U.S. PATENT DOCUMENTS

| | | | |
|---|---|---|---|
| 11,868,347 B1* | 1/2024 | Papakonstantinou | G06F 16/162 |
| 2006/0080285 A1* | 4/2006 | Chowdhuri | G06F 16/24532 |
| 2008/0144128 A1* | 6/2008 | Bhattacharjee | G06F 16/9017 |
| | | | 358/474 |
| 2010/0312762 A1 | 12/2010 | Yan et al. | |
| 2011/0010358 A1* | 1/2011 | Zane | G16B 30/10 |
| | | | 707/714 |
| 2011/0072006 A1* | 3/2011 | Yu | G06F 16/24535 |
| | | | 707/718 |
| 2014/0365533 A1* | 12/2014 | Debray | G06F 16/2228 |
| | | | 707/803 |
| 2015/0310030 A1* | 10/2015 | Balmin | G06F 16/1774 |
| | | | 707/704 |
| 2015/0370919 A1* | 12/2015 | Bornhoevd | G06F 16/9024 |
| | | | 707/798 |
| 2017/0060948 A1* | 3/2017 | Ma | G06F 16/2246 |
| 2017/0116289 A1* | 4/2017 | Deshmukh | G06F 16/24568 |
| 2017/0185645 A1* | 6/2017 | Agarwal | G06F 16/24552 |
| 2018/0121517 A1* | 5/2018 | Barsness | G06F 11/3409 |
| 2018/0314733 A1* | 11/2018 | Wen | G06F 16/24542 |
| 2018/0349374 A1* | 12/2018 | Gurajada | G06F 16/2255 |
| 2018/0365289 A1* | 12/2018 | Brown | G06F 16/24535 |
| 2019/0325046 A1* | 10/2019 | Novik | G06F 16/213 |
| 2020/0364279 A1* | 11/2020 | Pal | G06F 16/24568 |
| 2021/0263929 A1* | 8/2021 | Chen | G06F 16/24539 |
| 2021/0319349 A1* | 10/2021 | Srivastava | G06F 16/9574 |
| 2022/0113971 A1* | 4/2022 | Gao | G06F 9/3838 |
| 2023/0014697 A1 | 1/2023 | Freedman et al. | |

* cited by examiner

400

```
┌─────────────────────────────────────────────────────────────────┐
│ Determine a first parallelism attribute associated with a scan  │─402
│ operator that is associated with a cache preservation           │
│ characteristic                                                  │
└─────────────────────────────────────────────────────────────────┘
┌─────────────────────────────────────────────────────────────────┐
│ Cause the scan operator to be executed over a number of         │─404
│ compute nodes of a first node set corresponding to the first    │
│ parallelism attribute to read a dataset by the scan operator    │
│ and transform the dataset into an output data                   │
└─────────────────────────────────────────────────────────────────┘
┌─────────────────────────────────────────────────────────────────┐
│ Cause the output data to be consumed over a number of           │─406
│ dependent operators of the scan operator, the dependent         │
│ operators associated with a computation intensive characteristic│
└─────────────────────────────────────────────────────────────────┘
```

```
┌─────────────────────────────────────────────────────────────────┐
│ Increase a number of compute nodes of the first node set to     │─412
│ accommodate at least one of storage of objects scanned by       │
│ executing the scan operator or execution of the scan operator   │
└─────────────────────────────────────────────────────────────────┘
┌─────────────────────────────────────────────────────────────────┐
│ Decrease the number of compute nodes of the first node set      │─414
│ after completion of execution of the scan operator and expiry of│
│ a local cache policy of the first node set                      │
└─────────────────────────────────────────────────────────────────┘
```

```
┌─────────────────────────────────────────────────────────────────┐
│ Increase a number of compute nodes of the first node set to     │─422
│ accommodate execution of a first operator                       │
└─────────────────────────────────────────────────────────────────┘
┌─────────────────────────────────────────────────────────────────┐
│ Decrease the number of compute nodes of the first node set      │─424
│ after completion of the execution of the first operator         │
└─────────────────────────────────────────────────────────────────┘
```

FIG. 4C

CLUSTER VIEWS FOR COMPUTE SCALE AND CACHE PRESERVATION

CROSS-REFERENCE TO RELATED APPLICATIONS

This application claims priority to U.S. Provisional Patent Application Ser. No. 63/503,664, filed May 22, 2023, and titled "SPLIT CLUSTER FOR COMPUTE SCALE AND CACHE PRESERVATION," the entirety of which is incorporated by reference herein.

BACKGROUND

"Cloud computing" refers to the on-demand availability of computer system resources (e.g., applications, services, processors, storage devices, file systems, and databases) over the Internet and data stored in cloud storage. Servers hosting cloud based resources may be referred to as "cloud-based servers" (or "cloud servers"). A "cloud computing service" refers to an administrative service (implemented in hardware that executes in software and/or firmware) that manages a set of cloud computing computer system resources.

Cloud computing platforms include quantities of cloud servers, cloud storage, and further cloud computing resources that are managed by a cloud computing service. Cloud computing platforms offer higher efficiency, greater flexibility, lower costs, and better performance for applications and services relative to "on-premises" servers and storage. Accordingly, users are shifting away from locally maintaining applications, services, and data and migrating to cloud computing platforms. One of the pillars of cloud services are compute resources, which are used to execute code, run applications, and/or run workloads in a cloud computing platform. Such compute resources may be made available to users in sets, also referred to as "clusters."

Cloud data warehouses and big data analytics services use compute clusters to scale out the execution of complicated analytical queries that process massive amounts of data. The data may be stored in a cloud storage service like Microsoft Azure® Data Lake™. The compute nodes in modern clusters come equipped with high performance SSD (solid state drive) storage in addition to a decent amount of memory. The SSDs and memory across the compute nodes form the local caching tier of the warehouse. Data may be cached locally, both in memory and on disk, to optimize query performance. There may be an optional intermediate data tier between remote storage and the local SSD storage of the compute nodes. However, cache hits against the local caching layer offer the best performance.

Auto scaling is a technique in modern cloud data warehouses that dynamically grows and shrinks the size of a compute cluster based on workload demand. As the resource demand grows with more queries submitted to the system, more nodes are added to the cluster automatically and query processing adapts to take advantage of newer nodes. As demand goes down, nodes are removed from the compute cluster to reduce operational costs.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A distributed query processor in a server is configured for compute scale and cache preservation to enable more efficient cluster usage for query processing. The distributed query processor includes an operator analyzer and an operator scheduler. The operator analyzer determines a first operator of a graph of operators representative of a user query to have a first characteristic and is configured to assign the first operator to a first node set of a plurality of node sets. The first node set is associated with the first characteristic. A second node set of the plurality of node sets is associated with a second characteristic different from the first characteristic. The operator scheduler is configured to cause the first operator to be executed in the assigned first node set to generate a first operator result, and a query result to be generated based at least on the first operator result.

Further features and advantages of the embodiments, as well as the structure and operation of various embodiments, are described in detail below with reference to the accompanying drawings. It is noted that the claimed subject matter is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

FIG. 4A shows a flowchart of a process for assigning and utilizing parallelism attributes with respect to operators, in accordance with an embodiment.

FIG. 4B shows a flowchart of a process for auto scaling compute nodes for operators associated with a cache preservation characteristic, in accordance with an embodiment.

FIG. 4C shows a flowchart of a process for auto scaling compute nodes for operators associated with a computation intensive characteristic, in accordance with an embodiment.

The subject matter of the present application will now be described with reference to the accompanying drawings. In the drawings, like reference numbers indicate identical or

DETAILED DESCRIPTION

I. Introduction

Figure 1:
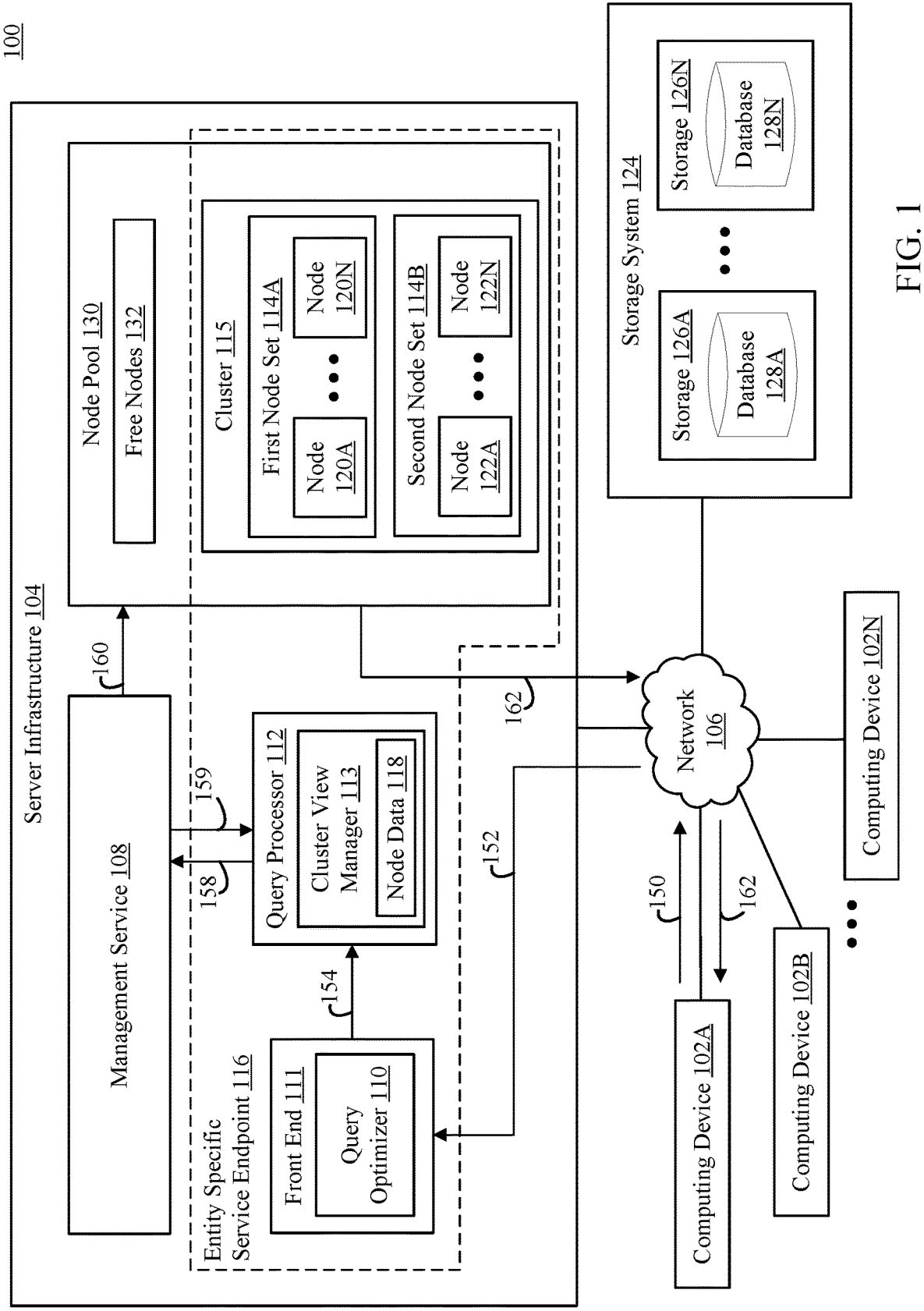
FIG. 1 shows a block diagram of a system for query execution that enables different scaling properties for different types of compute node sets, in accordance with an embodiment.

The following detailed description discloses numerous example embodiments. The scope of the present patent application is not limited to the disclosed embodiments, but also encompasses combinations of the disclosed embodiments, as well as modifications to the disclosed embodiments. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Users are shifting away from locally maintaining applications, services, and data and migrating to cloud computing platforms. Cloud computing platforms offer higher efficiency, greater flexibility, lower costs, and better performance for applications and services relative to "on-premises" servers and storage. Cloud-computing platforms utilize compute resources to execute code, run applications, and/or run workloads. Examples of such compute resources include, but are not limited to, virtual machines, virtual machine scale sets, clusters (e.g., Kubernetes clusters), machine learning (ML) workspaces (e.g., a group of compute intensive virtual machines for training machine learning models and/or performing other graphics processing intensive tasks), serverless functions, and/or other compute resources of cloud computing platforms. A "cluster" (also referred to herein as a "compute cluster") is a set of compute nodes (computing devices such as computers and servers with one or more processors, storage, and cache memory). A cluster or node set may comprise a set of compute nodes or sets of compute nodes of any number. A "user" may be a user account, a subscription, a tenant, or another entity that is provided services of a cloud computing platform by a cloud service provider. These clusters and other resources are used by users (e.g., customers) to run code, applications, and workloads in cloud environments. Customers pay for the resources of a computing platform that they consume.

Cloud data warehouses and big data analytics services use compute clusters to scale out the execution of complicated analytical queries that process massive amounts of data. The data may be stored in a cloud storage service like Microsoft Azure® Data Lake™. The compute nodes in modern clusters come equipped with high performance SSD (solid state drive) storage in addition to significant memory. The SSDs and memory across the compute nodes form the local caching tier of the warehouse. Data may be cached locally, both in memory and on disk, to optimize query performance. There may be an optional intermediate data tier between remote storage and the local SSD storage of the compute nodes. However, cache hits against the local caching layer offer the best performance.

Auto scaling is a technique used in modern cloud data warehouses to dynamically grow and shrink the size of a compute cluster based on workload demand. As the resource demand grows with more queries submitted to the system, more nodes are added to the cluster automatically and query processing adapts to take advantage of newer nodes. As demand goes down, nodes are removed from the compute cluster to reduce operational costs. Auto scaling may be controlled by a scaling policy which determines the conditions for scaling. The scaling policy may be tweaked to control the aggression of scale.

Caching implies affinity or locality, meaning any computation that could benefit from cached data should be performed on the compute nodes where the data is cached. As a query processor (e.g., a distributed query processor) scales a compute cluster based on the workload demand, existing caches are redistributed to evenly spread out the load. A highly volatile compute cluster is detrimental to the health of the caches. Compute intensive workloads require unlimited scale for performance. But keeping the whole cluster warm (e.g., kept active in an idle configuration) for cache preservation has significant cost overheads and it is difficult to balance the seemingly irreconcilable properties of locality and elasticity. Locality offers cache benefits and elasticity alleviates resource pressure in the system.

Embodiments described herein overcome limitations of conventional systems by the designation of sets of computing devices (e.g., clusters) to have different responsibilities and scalability characteristics.

In particular, in embodiments, to draw a desired balance between cache preservation and growth due to demand, a set of compute nodes of a cluster may be divided into separate node sets or types also referred to herein as "node sets" or "cluster views." A cluster view is a disjoint subset of nodes in a cluster. Cluster views allow configuration and management of different compute nodes for specific purposes. As different clusters belong to different query processors, the query processors may segment the clusters by their capacities into cluster views. A query processor stores identifiers for the nodes contained by its associated cluster and an indication of which cluster view each node is assigned.

In a query graph, the operators connected by an edge share a producer-consumer relationship. The child is the producer, and the parent is the consumer. As the producer, the child operator processes some information and produces new information to be consumed by its consumer parent. In other words, the producer transforms input information by some process. The output of the producer then serves as the input of the consumer parent. The data produced by operators during the course of query execution are known as intermediate results. The output from the root operator of the query graph is the final result of the query, which is returned back to the user. The intermediate results, if useless beyond the life cycle of the query, are discarded.

Each edge in a query graph represents a dependency constraint between a consumer operator (e.g., parent operator) and a producer operator (e.g., child operator). Each operator processes the information produced by its children and creates new information to be consumed by its parent(s), if any. The leaf operators that do not have any children may be scan operators which read data from a remote source. Filters, local aggregates, and other such computation may be pushed to the scan operators to optimize performance.

In an embodiment, the output data is directly stored in the storage of one or more compute nodes where the parent then runs. In a query graph, some operators may process data from a remote stable source and perform computations over the data. Other operators may solely process intermediate results. The data fetched from a remote stable storage may be cached on the compute nodes (e.g., locality nodes) to speed up future scans. Data may be cached both in storage (e.g., on disk) and/or in memory.

In one example, a locality type first set of compute nodes may be designated as a cache type cluster (also referred to as "locality view") and a utility type second set of compute nodes may be designated as a computation type cluster (also referred to as "utility view"). The locality and utility type views restrict access to specific sets of nodes to optimize (1) cache reuse or (2) elasticity, respectively. For instance, scan operators that benefit from local cache are scheduled in a locality view. The locality view compute nodes may be configured with high disk and memory sizes for caching while the utility nodes could be equipped with more CPU cores to enhance the performance of the computationally heavy operators (and may even be configured for GPU acceleration).

Furthermore, in another example, computationally heavy operators (e.g., of intermediate query graph nodes) are executed in the utility view. When a new query graph arrives, an operator analyzer processes the query graph to identify all the operators that benefit from caching or identify operators associated with a specific characteristic. In an embodiment, the operator analyzer may mark (e.g., make "1" or "true") a caching benefit property (e.g., called BenefitsFromCache) in each such operator that indicates the operator benefits more from data caching relative to other operator types. The caching benefit property may be used by an operator scheduler to determine a node set in which to execute each operator in. As the scan operators complete, they may produce results directly in the utility cluster for the consumption by their parent operators. It is noted, however, that results of a specific operator may produce results in a cluster selected based on characteristics of a parent operator to the operator.

While all operators may rely on the same compute cluster for their resource needs, not every operator benefits from caching as much as others. For instance, operators with a scan (i.e., read and transform) component benefit if the information they seek from a stable remote store is cached locally. The non-leaf operators in the graph are usually computationally heavy, involving sorting and global aggregation of intermediate results. Such operators are not bound by any locality constraints. However, the demand from such operators could cause the compute cluster to grow and negatively impact the cache distribution. Accordingly, embodiments segregate different operator types based on their locality and computation demands.

The operators that run in a locality view process data in the local caches, data pulled from remote store (caching is a by-product of this pull), or a combination of both (part cached, part pull). If the parent of one such operator has no use for caching, it may be scheduled in a utility view. In an embodiment, the child directly writes the results into the storage of the output nodes (could be either locality or utility view nodes). The operators that would benefit from caching may be found anywhere in the graph. These operators typically include all the leaf operators in the graph but may not exclusively be leaves. Finally, any operator needs CPU and memory (of one or more compute nodes) to process input information. The input data is fully available in local storage for intermediate results. For stable inputs (data read from a remote store), some or part of the input data may already be available on local disk/memory if it is pre-cached; if not, the data is pulled from the remote store.

A cluster view manager is configured to cause allocation of compute nodes to each cluster view (e.g., via a cluster scaler), including removing compute nodes and adding compute nodes, based on a workload demand indicated by a workload manager. The workload demand comprises the demand exerted by marked operators. Marked operators may indicate any number of operators associated with a type or characteristic, and the parallelism attribute of each operator. Based thereon, a cluster view manager may determine the size of each cluster view and cause the cluster to grow accordingly, including scaling to the determined size (i.e., number of compute nodes) for each cluster view. As an example, a number of compute nodes included in the utility view may be increased to accommodate executing an operator associated with a computationally intensive operator characteristic. The number of compute nodes of the utility view may be decreased after completing the execution of the operator, thereby avoiding holding back resources that would better be used elsewhere and avoiding a user paying for the unused compute nodes.

Separate cluster views enable the configuration of separate scaling policies. The utility view uses an aggressive scaling policy by the cluster view manager, which makes it highly volatile—the number of compute nodes may increase and/or decrease quickly. The utility nodes are acquired to process intermediate results and there may be no reason to retain utility nodes after their computation is complete. The locality view, on the other hand, is much more stable on account of a conservative scaling policy. The cluster view manager may quickly grow the locality view by auto scaling the number of compute nodes to meet the demand emanating from the scan operators. Once the locality view reaches a desired size, the size may be maintained even after recent execution of the workload is complete to keep the caches warm (e.g., active). When the workload returns, the warm caches will provide a major performance boost due to network I/O savings. The scaling policy may be configured to take into account the performance requirements of the workload and the budgetary constraints. When scaling the locality view, both the resource needs of the scan operators with any computation pushed onto them and the size of the input datasets are considered. The scaling policy may be configured based on these features. Because the demand from scan operators may drive growth of the locality view, a smaller size may be maintained for the locality view compared to the net size of the entire compute cluster. To keep caches warm, compute nodes of the locality view may maintain their caches (e.g., kept active in an idle configuration), which leads to substantial network I/O cost savings.

Additional cluster views may be created by the cluster view manager to serve specific query needs. For example, a third cluster view can be created, the third cluster view dedicated to performing system tasks (as opposed to query tasks) such as garbage collection, backup, index builds etc. The third cluster view requires specific, configurable policies for internal monitoring and maintenance. The characteristic of an operator may be determined by the operator analyzer as associated with a system task such as garbage collection, backup task, index build, or any other type of system task related to an internal system requirement. If a determined characteristic is observed for the first time by the query processor, the cluster view manager may create a new cluster view, associated with the new characteristic. Furthermore, the newly created cluster view may be scaled by the cluster view manager to accommodate other operators that the operator analyzer associates with the new characteristic. It is to be noted a cluster view manager may be alternatively referred to herein as a "node set manager."

The number of compute nodes a given task may be spread across is governed by a distributed degree of partitioned parallelism property of the operator, an example of which is the DistributedDegree of Partitioned Parallelism ("DOPP" or also referred to as "parallelism attribute"). A query optimizer determines how many compute nodes an operator may be spread across (e.g., at least) and assigns this quantity to the operator as the parallelism attribute. Furthermore, a parallelism attribute may also be associated with operators. For instance, a dataset may be processed (i.e., read and transformed) by a scan operator and the processed dataset may be consumed by one or more computationally heavy operators. In an embodiment, an operator includes a first and a second DOPP value, corresponding to the input and output of the operator, respectively. A number of compute nodes corresponding to the first DOPP of a scan operator, for example, determines the number of nodes required to execute the operator. A number of compute nodes corresponding to the second DOPP of the scan operator is equal to the first DOPP of a parent operator, which may be a computationally heavy operator, and determines the number of nodes required to execute the parent operator. The first DOPP of an operator may be equal to or different from the second DOPP of the same operator. The parent operator may execute across the compute nodes of the utility view, the number of compute nodes of the utility view corresponding to the first DOPP of the parent operator.

These and further embodiments are described as follows, including with respect to FIG. 1, which shows a block diagram of a system 100 for query execution that enables different scaling properties for different types of compute node sets, in accordance with an embodiment. As shown in FIG. 1, system 100 includes one or more computing devices 102A-102N, a server infrastructure 104, and a storage system 124, which are communicatively coupled by a network 106. Server infrastructure 104 is a network-accessible server set (e.g., a cloud-based environment or platform). As shown in FIG. 1. server infrastructure 104 includes a management service 108, a front end 111 that includes a query optimizer 110, a query processor 112 that includes a cluster view manager 113, and a node pool 130. Node pool 130 includes free nodes 132 and a node cluster 115. It is noted that any number of further clusters similar to cluster 115 may be present in server infrastructure 104 that are formed from resources of node pool 130 to service queries for entities. Cluster 115 includes a first node set 114A and a second node set 114B. In server infrastructure 104, an entity specific service endpoint 116 is present that is associated with an entity, such as, but not limited to, a customer, a tenant, a company, a department, a group, a person, a user, and/or the like. Entity specific service endpoint 116 includes front end 111, query processor 112, and cluster 115. Any number of entity specific service endpoints 116 may be present within server infrastructure 104 to efficiently manage queries for corresponding entities. System 100 is described in further detail as follows.

Computing devices 102A-102N may each be any type of stationary or mobile processing device, including, but not limited to, a desktop computer, a server, a mobile or handheld device (e.g., a tablet, a personal data assistant (PDA), a smart phone, a laptop, etc.), an Internet-of-Things (IoT) device, etc. Each of computing devices 102A-102N stores data and executes computer programs, applications, and/or services. Network 106 may comprise one or more networks such as local area networks (LANs), wide area networks (WANs), enterprise networks, the Internet, etc., and may include one or more wired and/or wireless portions Storage system 124 may be one or a plurality of network-accessible servers (e.g., in a cloud-based environment or platform). In an embodiment, storage system 124 is a distributed storage service comprising a server infrastructure in which data may be stored across multiple computing nodes. As shown in FIG. 1, storage system 124 includes storage 126A through storage 126N (collectively referred to as "storages 126A-126N") that each respectively include database 128A through 128N (collectively referred to as "databases 128A-128N"). Example types of storage suitable for storages 126A-126N are described elsewhere herein. Storage system 124 is communicatively coupled to server infrastructure 104 via network 106 (e.g., in a "cloud-based" embodiment). Storage system 124 may comprise an infinite number of databases of various structures, such as a data lake, for example.

In an embodiment, cluster 115 may be implemented in a datacenter (e.g., housed in one or more nearby buildings with associated components such as backup power supplies, redundant data communications, environmental controls, etc.), in a distributed collection of datacenters. In accordance with an embodiment, system 100 comprises part of the Microsoft® Azure® cloud computing platform, owned by Microsoft Corporation of Redmond, Washington, although this is only an example and not intended to be limiting.

Each of nodes 120A-120N and 122A-122N may comprise one or more server computers, server systems, and/or computing devices. Each of nodes 120A-120N and 122A-122N may be configured to execute one or more software applications (or "applications") and/or services and/or manage hardware resources (e.g., processors, memory, etc.), which may be utilized by users (e.g., customers or computing devices 102A-102B) of the network-accessible server set. Nodes 120A-120N and 122A-122N may also be configured for specific uses, including to execute virtual machines, machine learning workspaces, scale sets, databases, etc. Note that query processor 112 may be separate from or included in cluster 115. In embodiments, any of storages 126A-126N or databases 128A-128N may be separate from (as shown in FIG. 1) or included in server infrastructure 104.

First node set 114A and second node set 114B of cluster 115 are compute cluster views (or "computer clusters") that include multiple compute nodes (computing devices) and are configured to perform computational workloads by request. First node set 114A includes nodes 120A-120N and second node set 114B includes nodes 122A-122N. Each of node sets 114A and 114B are accessible via front end 111 (e.g., in a "cloud-based" embodiment) to build, deploy, and manage applications and services, including the execution of multi-query analytics workloads against a distributed database. Nodes 120A-120N and 122A-122N of node sets 114A and 114B may each include any number and combination of processors, storage devices, and memory (e.g., for caching data). Cluster 115 may comprise further node sets, nodes, and/or clusters besides those shown in FIG. 1.

Management service 108 may be configured to manage and scale resources in server infrastructure 104, including the management and scaling of any number of entity specific service endpoints 116 in server architecture 104. Management service 108 may also manage the distribution to users (e.g., individual users, tenants, customers, and other entities) of resources of server infrastructure 104. Management service 108 is a service that executes on a computing device/node or a set of computing devices/nodes of server infrastructure 104. As shown in FIG. 1, server infrastructure 104 includes a single management service 108; however, it is also contemplated herein that a server infrastructure may include multiple management services. An example of management service 108 includes, but is not limited to, Azure®

Resource Manager™ owned by Microsoft® Corporation, although this is only an example and is not intended to be limiting.

Users are enabled to utilize entity specific service endpoint 116 via computing devices 102A-102N. The user may be enabled to sign-up with a cloud services subscription with a service provider of the network-accessible server set (e.g., a cloud service provider). Upon signing up, the user may be given access to a portal of server infrastructure 104 (not shown in FIG. 1). The user may access the portal via computing devices 102A-102N. For example, the user may use a browser executing on computing device 102A to traverse a network address (e.g., a uniform resource locator) to a portal of server infrastructure 104, which invokes a user interface (e.g., a web page) in a browser window rendered on computing device 102A. The user may be authenticated (e.g., by requiring the user to enter user credentials (e.g., a username, password, PIN, etc.)) prior to receiving access to the portal.

Upon receiving authentication, the user may utilize the portal to perform various cloud management-related operations (also referred to as "control plane" operations). Such operations include, but are not limited to, creating, deploying, allocating, modifying, and/or deallocating (e.g., cloud-based) compute resources; building, managing, monitoring, and/or launching applications (e.g., ranging from simple web applications to complex cloud-based applications); specifying (1) a maximum size for cluster 115 (in which the specified size may be a consideration for query processor 112 in splitting the cluster among multiple node sets) and (2) a cache preservation policy (in which customers may decide whether or not to keep caches warm and for how long); submitting queries (e.g., SQL queries) to databases of server infrastructure 104 such as databases 128A-128N; etc. It is noted that the specification of a maximum cluster size by a user is optional and the user instead may opt for unbounded cluster growth. Examples of compute resources include, but are not limited to, virtual machines, virtual machine scale sets, clusters, ML workspaces, serverless functions, storage disks (e.g., maintained by storage node(s) of server infrastructure 104), web applications, database servers, data objects (e.g., data file(s), table(s), structured data, unstructured data, etc.) stored via the database servers, etc. The portal may be configured in any manner, such as any combination of text entry, for example, via a command line interface (CLI), one or more graphical user interface (GUI) controls, etc., to enable user interaction.

In an embodiment, a user-provided query may be executed in entity specific service endpoint 116. For instance, a user query 152 may be submitted by the user at computing device 102A, transmitted from computing device 102A over network 106, and received by front end 111 of entity specific service endpoint 116. User query 152 may be a query of any type, format, or syntax, such as a SQL (structured query language) query, that includes one or more expressions, predicates, statements, etc. Query optimizer 110 of front end 111 is configured to optimize user query 152 by creating a graph of operators from user query 152 referred to as query graph 154. In an embodiment, query optimizer 110 generates query graph 154 as a set of vertices (representing operators) interconnected by edges (representing dependencies). Query optimizer 110 may also determine a parallelism attribute (i.e., DOPP) of each of the query operators and mark each operator according to its parallelism attribute in query graph 154. Generated query graph 154 is transmitted to query processor 112, which analyzes query graph 154 for execution in cluster 115. Query processor 112 causes the operators of the query to be executed in cluster 115 to generate a query result 162. Query result 162 is transmitted over network 106 to computing device 102A in response to user query 152.

Free nodes 132 comprises compute nodes of node pool 130 that are unused and available for allocation. Free nodes 132 may consist of either homogeneous nodes or heterogeneous nodes configured differently for different use cases. If heterogeneous compute nodes are supported, then query processor 112 may request, via node allocation request 158, that management service 108 allocate and/or scale different nodes types in different quantities. Cluster view manager 113 is responsible for assigning these new nodes of different types to the appropriate cluster views. For example, compute nodes of Type A may have a higher number of CPU cores while compute nodes of Type B may have greater disk (storage) and memory capacity. Query processor 112 may request, for example, 5 of Type A nodes and 2 of Type B nodes. Upon receiving confirmation of the allocated nodes by management service 108, via node allocation response 159, query processor 112 may assign the 5 Type A nodes to the Utility view and the 2 Type B nodes to the Locality view.

As shown in FIG. 1, query processor 112 receives query graph 154. Query processor 112 is configured to process query graph 154 to cause query results 162 to be generated. Furthermore, via cluster view manager 113, query processor 112 is configured to manage cluster views that process query operators. For instance, query processor 112 may request increases or decreases in the number of assigned compute nodes of first node set 114A and second node set 114B according to the computational demand of query graph 154. As shown in FIG. 1, query processor 112 may transmit node allocation request 158 to management service 108, which allocates or reclaims compute nodes of node pool 130 via node allocation 160 accordingly. For instance, in response to node allocation request 158, management service 108 may generate node allocation 160 to allocate nodes from free nodes 132 to cluster 115, or to reclaim nodes from cluster 115 back to free nodes 132. Node allocation request 158 and node allocation 160 each indicate which cluster for which to increase or decrease nodes. Management service 108 may notify query processor 112 via node allocation response 159 that the node allocation request 158 has been fulfilled.

Node data 118 maintained by cluster view manager 113 includes various information regarding the compute nodes of cluster 115, such as indications of which node set types are present in cluster 115, which compute nodes of cluster 115 are assigned to each node set, the compute node(s) of cluster 115 to which operators of a query are assigned, etc. As shown in FIG. 1 as an example, node data 118 includes data for nodes 120A-120N and 122A-122N. The data types of node data 118 may include, for each node, a unique node identification (ID), a unique node name, the node set assigned to the node, or a combination of the aforementioned data types. Example representations of node data 118 include a table, a log, or any data structure comprising the aforementioned data types.

Cluster view manager 113 of query processor 112 is configured to balance cache preservation and compute growth due to demand according to characteristics of the operators indicated in query graph 154. In particular, cluster view manager 113 is responsible for managing the node sets (i.e., cluster views) and determining how to split cluster capacity among the cluster views. If cluster growth is unbounded, cluster view manager 113 may obtain as many nodes as needed for each node set based on the current workload demand. If growth is limited (e.g., customer has a maximum cluster size for budgetary reasons), cluster view manager 113 may determine how to split capacity among the cluster views. Cluster view manager 113 may further be responsible for maintaining data in node data 118, such as a node to node set association. Cluster view manager 113 is also configured to create new cluster views. If a cluster view type does not exist for an operator analyzed to have a new characteristic, cluster view manager 113 may generate a new cluster view according to the new characteristic. For example, in an embodiment, for the processing of one or more user queries, query processor 112 may analyze a first operator to have a first characteristic, analyze a second operator to have a second characteristic, and analyze a third operator to have a third characteristic. In another example, query processor 112 may designate a first type cluster view as a cache type (locality view), designate a second type cluster view as a computation type (utility view), and designate a third type cluster view as a system task type. It is noted that query processor 112 and cluster view manager 113 may be configured to handle any number of additional operators or cluster types.

Figure 2:
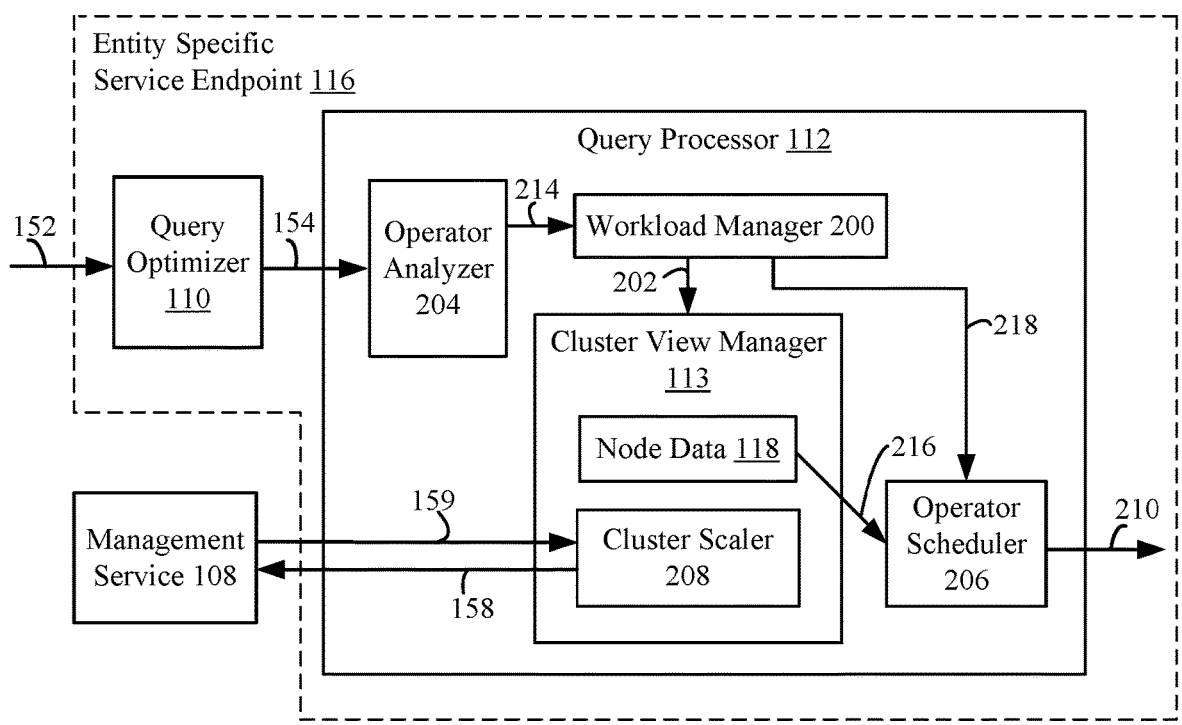
FIG. 2 shows a block diagram of a query processor configured to schedule queries for processing by compute nodes of various node set characteristics, in accordance with an embodiment.

These and further embodiments are further described with respect to FIG. 2. For example, FIG. 2 shows a block diagram of entity specific service endpoint 116 and management service 108, configured to schedule queries for processing by compute nodes of various node set characteristics, in accordance with an embodiment. For example, entity specific service endpoint 116 and management service 108 may execute in server infrastructure 104 of FIG. 1. As shown in FIG. 2, entity specific service endpoint 116 includes query optimizer 110 and query processor 112. Query processor 112 includes an operator analyzer 204, a workload manager 200, cluster view manager 113 comprising node data 118 and a cluster scaler 208, and an operator scheduler 206. These components of FIG. 2 are further described as follows.

Operator analyzer 204 receives query graph 154 as input to analyze and/or determine respective characteristic(s) for each operator. For example, operator analyzer 204 may mark a utility characteristic to an operator and may mark a locality characteristic to another operator, based on an analysis. Operator analyzer 204 generates marked operators 214, which indicates each operator of query graph 154 marked with its determined characteristic and parallelism attribute (when present).

Workload manager 200 receives marked operators 214 from operator analyzer 204. In an embodiment, workload manager 200 enlists multi-query workloads comprising a plurality of user queries that are represented as hypergraphs of operators (i.e., a graph including multiple graphs of operators corresponding to user queries). For instance, workload manager 200 may enlist a query graph, received from operator analyzer 204, into a hypergraph of query graphs and compute composite demands (i.e., workload demand 202) for the query graphs and hypergraph. Workload demand 202 may comprise a workload demand profile including the distribution of demand across operators of different characteristics, the number of such operators, and other related information. Workload manager 200 provides workload demand 202 to cluster view manager 113 to determine how much to grow and/or shrink each cluster view. Workload manager 200 also tracks query graphs (e.g., query graph 154) of a hypergraph and, in doing so, manages the dependencies among the operators and informs operator scheduler 206 via released operators 218 when operators are ready to execute. Workload manager 200 releases operators to operator scheduler 206 via released operators 218 after dependency constraints of the operators have been satisfied and the operators are unblocked for execution. Released operators 218 may comprise a list, for example, of operators ready to execute. Multiple new operators may be unblocked around the same time, as determined by workload manager 200, and of which operator scheduler 206 may be notified by workload manager 200.

Cluster view manager 113 receives workload demand 202, and based thereon, is configured to manage the node sets of cluster 115 and create new node sets in cluster 115 as needed. For instance, cluster view manager 113 utilizes workload demand 202 to determine cluster scaling needs, and partition cluster capacity into cluster views. Furthermore, in an embodiment, cluster view manager 113 is responsible for organizing clusters and node sets into different types and may create new clusters or node sets as new characteristics not previously determined by operator analyzer 204 are received. Cluster view manager 113 manages node data 118, which is accessible and read by operator scheduler 206 via node data read 216. Furthermore, cluster view manager 113 comprises cluster scaler 208, which receives scaling requests from cluster view manager 113 to scale specific cluster views and/or node sets as determined by cluster view manager 113. Cluster view manager 113 may cause cluster scaler 208 to issue a scaling request for a single cluster view, or cause cluster scaler 208 to issue a composite scaling request for more than one cluster view. For instance, if the locality view node set needs 3 nodes, and the utility view node needs 5 nodes, cluster view manager 113 may instruct cluster scaler 208 to request 8 nodes from management service 108 in a single scaling request, and after the 8 nodes are allocated to cluster 115, may assign 3 of the nodes to the locality view node set and 5 of the nodes to the utility view node set.

Operator scheduler 206 receives released operators 218 from workload manager 200 and reads node data 118 via node data read 216, and based thereon, is configured to generate operator schedule 210. Operator schedule 210 is a schedule by which operators are executed in specific node sets and is generated based on the compute demand of the operators indicated in released operators 218 and upon node availability. To cause execution of an operator indicated in released operators 218, operator scheduler 206 decodes the characteristics of the operator to identify the cluster view for execution of the operator. Once a cluster view is identified, operator scheduler 206 reads and/or queries node data 118 of cluster view manager 113 for information on the nodes assigned to the corresponding node set. Operator schedule 206 receives the node information in node data read 216, and based therein, is enabled to schedule the operator for execution in a node (or nodes) identified in node data read 216. Operator scheduler 206 may handle multiple operators from multiple queries in a similar manner to schedule each operator in a node set corresponding to their characteristic, and may optimize the schedule for best performance.

Cluster scaler 208 communicates with management service 108 to scale (increase or decrease) the nodes assigned to cluster 115 of FIG. 1 based on the requirements of node sets 114A and 114B (corresponding to cluster views), which thereby impacts the size of node sets 114A and 114B. For example, an operator having a parallelism attribute of 5 may have been assigned by operator analyzer 204 to first node set 114A. However, cluster view manager 113 may determine first node set 114A only has 2 nodes. Accordingly, cluster scaler 208 transmits node allocation request 158 to management service 108 to request an additional 3 nodes (to achieve the parallelism attribute of 5) for allocation to cluster 115. In response, management service 108 may allocate 3 additional nodes to cluster 115 from free nodes 132. Alternatively, if cluster view manager 113 determines first node set 114A has 8 nodes. Cluster scaler 208 may transmit node allocation request 158 to management service 108 to return the 3 extra nodes (assuming other operators are not executing in the 3 nodes) from node set 114A. In response, management service 108 may reclaim the three nodes from cluster 115 back to free nodes 132 of FIG. 1, thereby conserving resources. Cluster view manager 113 may determine the number of nodes by which to scale a cluster, the node set(s) to which newly allocated nodes are assigned, and the node set(s) from which reclaimed nodes are taken.

Figure 3:
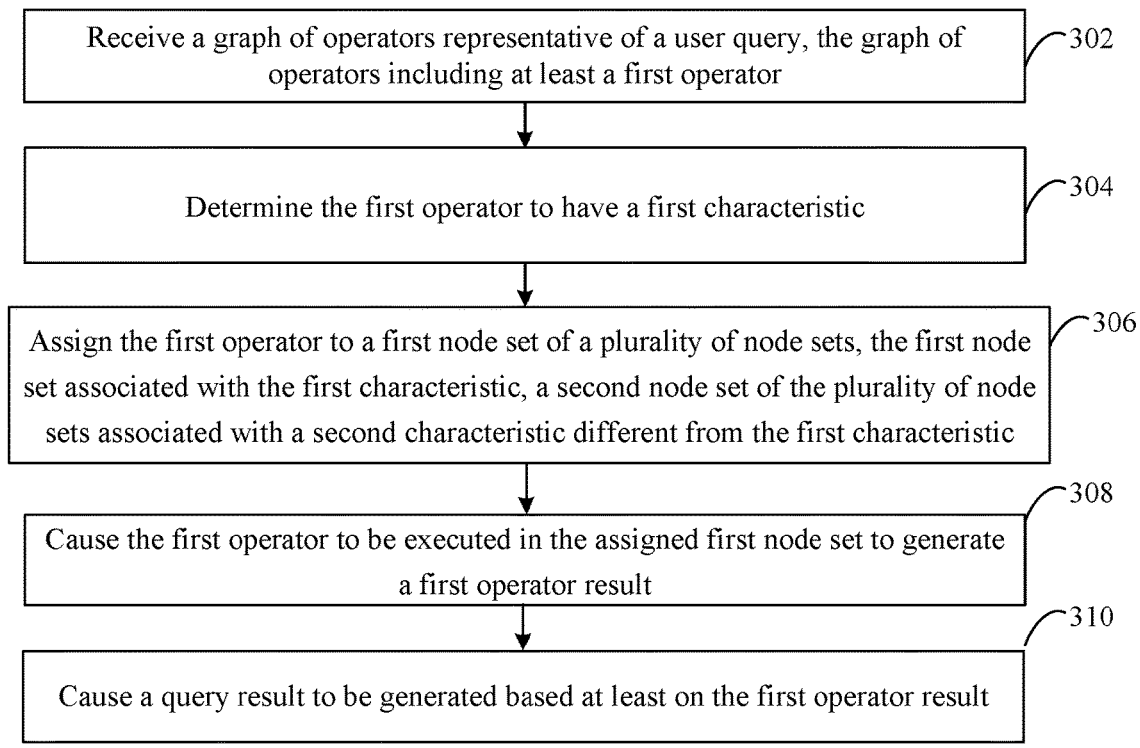
FIG. 3 shows a flowchart of a process for processing queries in node sets of various types, in accordance with an embodiment.

For illustrative purposes, FIG. 2 is described as follows with respect to FIG. 3. FIG. 3 shows a flowchart 300 of a process for processing queries in node sets of various types, in accordance with an embodiment. Query processor 112 may operate according to flowchart 300 in embodiments. Note that not all steps of flowchart 300 need be performed in all embodiments. Further structural and operational embodiments will be apparent to persons skilled in the relevant art(s) based on the following description of FIGS. 2 and 3.

Flowchart 300 begins with step 302. In step 302, a graph of operators including at least a first operator and representative of a user query, is received. As shown in FIG. 2. operator analyzer 204 receives query graph 154 from query optimizer 110. In an embodiment, query graph 154 may be a DAG (directed acyclic graph), such that edges indicate the passage of data in a single direction from a source vertex (e.g., child vertex) to a destination vertex (e.g., a parent vertex). Each vertex of query graph 154 is an operator (e.g., a scan operator, an expression, etc.) and encapsulates some work (e.g., a data scan, an aggregate operation, etc.) to be performed by one or more compute nodes. Note that user query 152 received by query optimizer 110 may be enlisted and managed by workload manager 200 in multiple user queries in a multi-query workload. Workload manager 200 may enlist user query 152 into a hypergraph consisting of all user queries in workload manager 200.

In step 304, the first operator is determined to have a first characteristic. In an embodiment, to draw a balance between cache preservation and compute growth due to demand, cluster view manager 113 segments a cluster into multiple cluster views, such as a locality view and a utility view. In particular, a cluster view is a disjoint subset of nodes in a cluster and restricts access to specific sets of nodes to optimize one of (1) cache reuse or (2) elasticity. Scan operators that benefit from cache are scheduled in the locality view. When a new query graph arrives, operator analyzer 204 is configured to process the graph to identify all the operators that would benefit from caching and sets an attribute or property (e.g., BenefitsFromCache) to true in each such operator, and generates marked operators 214. In another embodiment, operator analyzer 204 may analyze operators according to other attributes and characteristics, such as system tasks, and generate marked operators 214. Accordingly, in an example, in step 304, the first characteristic of a first operator may be determined to be a cache preservation characteristic, which corresponds to the first operator that benefits from locality by accessing cached data both in memory and on local disk.

In an embodiment of step 304, the first operator is determined to have a first characteristic that is a computation intensive characteristic. In an embodiment, computationally intensive operators are executed in the utility view. When a new query graph arrives, operator analyzer 204 is configured to process the graph to identify all operators that would marginally benefit from caching. Accordingly, continuing the above example, in step 304, the first characteristic of a first operator may be determined to be a computation intensive characteristic in marked operators 214, corresponding to the first operator that is computationally intensive and would yield little benefit from caching.

In step 306, the first operator is assigned to a first node set of a plurality of node sets, wherein the first node set is associated with the first characteristic of the first operator, and the plurality of node sets includes a second node set associated with a second characteristic different from the first characteristic. In an embodiment, the first operator of marked operators 214 may be assigned by operator analyzer 204 to the first node set. In an example, the first operator may be marked or assigned to a first node set that is associated with a locality cluster. Accordingly, continuing the example of above, the first characteristic of the first operator indicated in marked operators 214 may be a cache preservation characteristic.

In another embodiment of step 306, the first operator is assigned to the first node set associated with a first characteristic that is a computation intensive characteristic. The first operator of marked operators 214 may be assigned by operator analyzer 204 to a first node set associated with the computation intensive characteristic. Operator analyzer 204 may be further configured to mark or assign additional operators having the computation intensive characteristic to a first node set also associated with the computation intensive characteristic. The first operator is indicated in marked operators 214 as associated with the computation intensive characteristic prior to assignment to a node set. Instances in which a node set does not exist for a characteristic, cluster view manager 113 may generate a new node set associated with the new characteristic.

In step 308, the first operator is caused to be executed in the assigned first node set to generate a first operator result. As shown in FIG. 2, operator schedule 210 causes operators of query graph 154 to be executed according to the optimized schedule of operator schedule 210. Each operator is executed by the one or more compute nodes of the cluster to which they are assigned. The number of compute nodes used to execute an operator may be determined by their corresponding parallelism attribute, where the operator is parallelized over the corresponding number of compute nodes. Continuing the above example, operators of operator schedule 210 that are scheduled in the locality cluster complete their data scans and computations in the locality cluster as child operators, and their results may be directly stored in the utility cluster for consumption by their parent operators.

In step 310, generation of the query result is caused based at least on the first operator result. In an embodiment, a compute node (e.g., nodes 120A-120N, nodes 122A-122N) that executes the root operator of query graph 154 receives the results generated by its child operators and generates query result 162 as a response to user query 152. As further described elsewhere herein, operator scheduler 206 receives released operators 218 from workload manager 200, which indicates operators available to run, and reads node data 118 of cluster view manager 113 to determine available nodes of the corresponding cluster views. Based thereon, operator scheduler 206 generates operator schedule 210 to execute the available operators. The final root operator is ultimately executed in this manner to generate query result 162, which is returned to the user that submitted user query 152.

As described above, operators may be assigned parallelism attributes that indicate a number of compute nodes across which the operator may be executed in a parallel manner (e.g., operations of the operator may be sub-divided by the number indicated by the parallelism attribute, to be operated across the number of compute numbers in parallel). As such, the parallelism attributes enable faster execution of operators, and more efficient utilization of compute resources (e.g., processors, storage, memory, etc.) during their execution. For instance, FIG. 4A shows a flowchart 400 of a process for assigning and utilizing parallelism attributes to operators, in accordance with an embodiment. Operator scheduler 206 and query optimizer 110 may operate according to flowchart 400 in embodiments. Note that not all steps of flowchart 400 need be performed in all embodiments. Further structural and operational embodiments will be apparent to persons skilled in the relevant art(s) based on the following description of FIG. 4A.

In step 402, a first parallelism attribute associated with a scan operator that is associated with the cache preservation characteristic is determined. In accordance with one embodiment, query optimizer 110 determines the first parallelism attribute associated with the scan operator, having received user query 152. For example, as shown in FIG. 2, query optimizer 110 may be configured to transform user query 152 to query graph 154 and assign a parallelism attribute to each operator of query graph 154. The parallelism attribute of an operator is the number (e.g., minimal number) of compute nodes over which the operator may be spread for efficient parallel computation. The parallelism attribute may be indicated in query graph 154 by query optimizer 110.

In step 404, the scan operator is caused to execute over a number of compute nodes of a first node set corresponding to the first parallelism attribute to read and transform a dataset into an output data. In accordance with one embodiment, operator scheduler 206 causes execution of the scan operator over a number of compute nodes. The dataset may be remotely retrieved over network 106 from databases 128A-128N or storages 126A-128N of remote storage system 124 in FIG. 1 and/or one or more of computing devices 102A-102N. Query optimizer 110 receives the dataset via user query 152 and determines operations required to read and transform the dataset. The operations may be representative of operators of query graph 154, which is an input to query processor 112 to output operator schedule 210 from operator scheduler 206, as described elsewhere herein.

In step 406, the output data is caused to be consumed over a number of dependent operators of the scan operator, wherein the dependent operators are associated with a computation intensive characteristic. In accordance with one embodiment, operator scheduler 206 causes the output data to be transformed from the dataset and consumed over a number of dependent operators of the scan operator. For example, as shown in FIG. 2, operator scheduler 206 outputs operator schedule 210 as a schedule by which to execute operators. In accordance with one embodiment, the output data transformed from the dataset is consumed over a number of operators that are associated with a same or different characteristic than the scan operator and correspond to the first parallelism attribute. Parent and child operators may share the same or different characteristics.

A scan operator may be spread over a number of compute nodes (e.g., in the cache type cluster or locality view) equal to its parallelism attribute. Note that as scan operators are scheduled in the locality view by operator scheduler 206, the DOPP of each such operator may be adjusted by operator scheduler 206 to meet the current size of the view, in an embodiment. Doing so may result in uniform cache distribution across datasets. For example, consider a distributed dataset D1 that is partitioned into 100 segments (called cells) and a locality view that is 10 nodes large. A round-robin cell allocation scheme may ensure that 10 distinct cells are mapped to each of the 10 compute nodes. Once the cells are fully cached across the 10 nodes, any query involving a scan over D1 may be configured to use the same parallelism attribute for the associated operator and reuse the cached information in the same way. This allows for perfect join alignment if two different hash-distributed datasets are partitioned into the same number of cells and the join key is used for the hash distribution. The cache hits received by stretching out each scan operator to the same degree typically outweigh any potential performance penalty paid by allowing each operator to take up a slice of the entire cluster during resourcing.

Given the size of the datasets involved in a workload, there may be a desired (e.g., even optimal) size of the locality view beyond which further scaling by cluster scaler 208 may not yield further performance benefits. Such scaling should not exceed the highest number of cells that any dataset supports. The desired size may be a function of the desired cache density relative to the core capacity per node. Once the locality view attains the maximize size and all data is cached, scans may be processed at a relatively high rate. However, if it ever becomes a bottleneck for super demanding workloads with an exceptionally high degree of concurrency, additional instances of the locality view may be spun up or created. Such additional instances of the locality view are not required to be of the same size as the initial locality view instance.

The utility view, on the other hand, may be grown by cluster view manager 113 with no theoretical limitation. Unburdened by locality constraints, each computationally intensive operator may essentially run on a disjoint subset of utility nodes, as though each intermediate operator receives its own subcluster. Cluster view manager 113 may maintain a maximum growth cap on compute nodes for various reasons, including budgetary restrictions. Once the max cap is hit, some intermediate operators may be designated by an operator scheduler to share compute nodes with other operators. However, a maximum cap on compute nodes for utility enforced by cluster view manager 113 may be significantly larger than that of locality because utility nodes are all acquired for a brief amount of time. Cluster view manager 113 may control utility view growth to closely follow the workload.

As described above, auto scaling is a technique used in modern cloud data warehouses to dynamically grow and shrink the size of a compute cluster based on workload demand. As the resource demand grows with more queries submitted to the system, more nodes are added to the cluster automatically and query processing adapts to take advantage of newer nodes. An example of increased auto scaling is depicted in FIG. 4B, which shows a flowchart 410 of a process for auto scaling compute nodes for an operator associated with a cache preservation characteristic, in accordance with an embodiment. Cluster scaler 208 may operate according to flowchart 410 in embodiments. Further structural and operational embodiments will be apparent to persons skilled in the relevant art(s) based on the following description of FIG. 4B. Further details for an example implementation of auto scaling compute nodes may be found in U.S. application Ser. No. 18/475,017, titled "ONLINE INCREMENTAL SCALING OF A COMPUTE CLUSTER," filed on same date herewith, and which claims priority to provisional U.S. Application No. 63/503,547, filed May 22, 2023, and titled "ONLINE INCREMENTAL SCALING OF A COMPUTE CLUSTER," the entireties of which are incorporated by reference herein.

Flowchart 410 includes step 412, in which a number of compute nodes of a first node set is increased to accommodate at least one of: storing of objects scanned by executing a scan operator, or execution of the scan operator, wherein the scan operator is associated with a cache preservation characteristic. In accordance with one embodiment, cluster scaler 208 is configured to perform step 412. As shown in FIG. 2, cluster scaler 208 is configured to transmit a node allocation request 158 to request that compute nodes be scaled upward (increased) in cluster 115 to accommodate scan operator execution and/or storage of objects scanned by executing the scan operators. When management service 108 allocates nodes to cluster 115 according to the scaling request, cluster view manager 113 manages the allocated nodes by determining in which node set (i.e., first node set 114A and second node set 114B) to place the nodes. The access of objects (e.g., data) may be serviced by a local cache, remote storage, or a combination of both. Depending on the network I/O or computational demands of the scan operator, the increase of compute nodes may be necessary to accommodate the execution of a task. For a first node set of a locality view type, the increase of compute nodes may be limited by the highest number of compute nodes available, and the locality view may increase until a desired (e.g., optimal) size is reached. An optimal size is indicative of when the best possible workload performance is achieved.

As described above, auto scaling may automatically increase a number of compute nodes to a cluster as resource demand increases with more queries submitted to the system, and query processing adapts to take advantage of the additional nodes. Conversely, as demand decreases, nodes may be removed from the compute cluster to reduce operational costs. An example of such bi-directional auto scaling is depicted in FIG. 4B, step 414, in which the number of compute nodes of the first node set are decreased after completion of execution of the scan operator and expiry of a local cache policy of the first node set, wherein the scan operator is associated with a cache preservation characteristic. For instance, cluster view manager 113 is configured to cause an increase in nodes via cluster scaler 208 of FIG. 2. In particular, cluster scaler 208 may transmit a node allocation request 158 to cause a decrease in the number of compute nodes of the first node set. The number of compute nodes of the cluster may be decreased by management service 108 after completion of execution of the scan operator and after a local cache policy has expired on the scan operator. Depending on the network I/O or the decrease of computational demands of cluster 115, for example, decreasing compute nodes may free up nodes for execution of other tasks in a query or multi-query workload and enable further efficiency in query processing performance. In an embodiment, cluster view manager 113 may specify a list of nodes to remove from cluster 115 by management service 108, wherein the list is extracted from node data 118.

Another example of bi-directional auto scaling is depicted in FIG. 4C, which shows a flowchart 420 of a process for auto scaling compute nodes for an operator associated with a computation intensive characteristic, in accordance with an embodiment. Cluster scaler 208 may operate according to flowchart 420 in embodiments. Note that not all steps of flowchart 420 need be performed in all embodiments. Further structural and operational embodiments will be apparent to persons skilled in the relevant art(s) based on the following description of FIG. 4C.

Flowchart 420 includes steps 422 and 424. In step 422, a number of compute nodes of a first node set is increased to accommodate execution of a first operator, wherein the first operator is associated with a computation intensive characteristic. In accordance with one embodiment, cluster view manager 113, via cluster scaler 208, increases the number of nodes of the first node set to accommodate execution of the first operator. Cluster scaler 208 is configured to allocate compute nodes to and from cluster 115 when instructed by cluster view manager 113 based on workload demand 202. In one embodiment, the first node set may be one of a utility view in which intermediate results are stored and there is no theoretical limitation on growth. Unburdened by locality constraints, each computationally intensive operator may essentially run on a disjoint subset of utility nodes, which are all acquired for a brief amount of time. For this reason, the first node set may grow throughout its lifetime, without a need for caching. The benefit of this growth allows for increased workload capacity and increased accommodation to execute other operators in a workload.

In step 424 of FIG. 4C, the number of compute nodes of the first node set is decreased after completion of the execution of the first operator, wherein the first operator is associated with a computation intensive characteristic. In accordance with one embodiment, cluster view manager 113, via cluster scaler 208, causes a decrease in the number of compute nodes of the first node set after execution of the first operator completes. In particular, cluster scaler 208 transmits node allocation request 158 to management server 108 to request that one or more nodes be reclaimed from the cluster. Cluster view manager 113 determines the specific node set from which the nodes are reclaimed. The first node set may initially grow to accommodate computationally intensive operators, and later shrink (reduce number of nodes) as such operators complete their computations, with little to no need for caching. The benefit of such shrinking allows for operational cost to be reduced.

Figure 5:
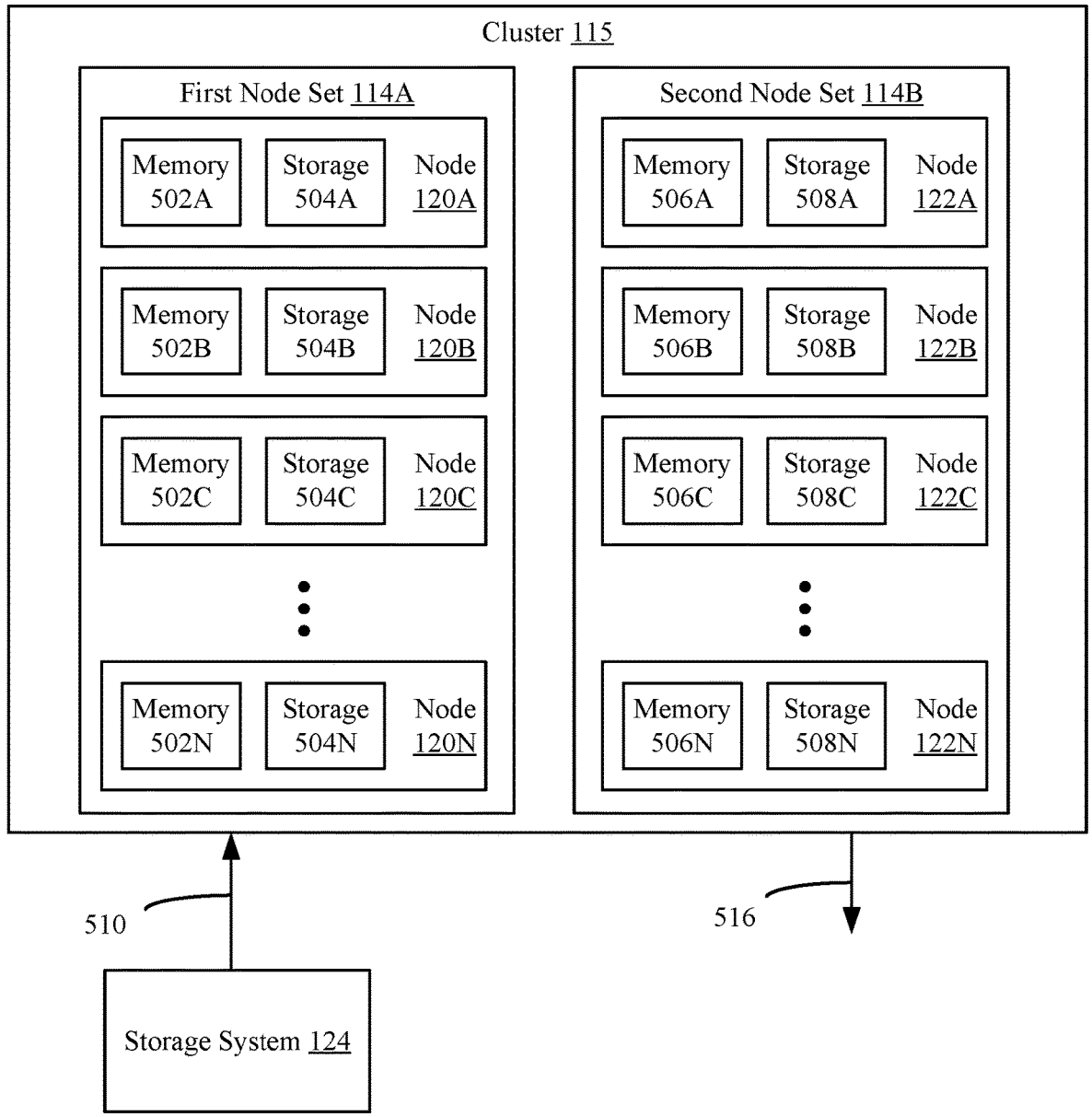
FIG. 5 shows a block diagram of a cluster of node sets configured to process query operators of one or more queries, in accordance with an embodiment.

As an illustration of cache and computation type cluster views, FIG. 5 is described. FIG. 5 shows a block diagram of node sets in a cluster configured to process query operators of one or more queries, in accordance with an embodiment, comprising a block diagram of a system 500 that includes storage system 124 and cluster 115. Cluster 115 includes first node set 114A and second node set 114B, either of which may be a cache type or a computation type cluster, in accordance with one embodiment. As shown in FIG. 5, first node set 114A includes nodes 120A-120N and second node set 114B includes nodes 122A-122N. Furthermore, each of nodes 120A-120N and nodes 122A-122N include corresponding processors (not shown in FIG. 5), storage, and memory. For instance, node 120A includes memory 502A and storage 504A, node 120B includes memory 502B and storage 504B, node 120C includes memory 502C and storage 504C, node 120N includes memory 502N and storage 504N, node 122A includes memory 506A and storage 508A, node 122B includes memory 506B and storage 508B, node 122C includes memory 506C and storage 508C, and node 122N includes memory 506N and storage 508N.

In FIG. 5, memory 502A-502N and 506A-506N (and disk from the local cache, not shown in FIG. 5) may operate, at least in part, as cache memory for data storage. In first node set 114A, memory 502A-502N and storage 504A-504N may cache data retrieved by scanning (i.e., read and transformed) or processing dataset 510 from storage system 124 and may retain the cached data for multiple scan operators configured to scan the same dataset 510. This enables dataset 510 to be scanned and cached once for multiple scan operators, thereby saving scan time, processor cycles, etc., by reducing the number of reads performed remotely. Furthermore, nodes 122A-122N of second node set 114B may be used for computation heavy operators. Second node set 114B may output a result 516 based on a root operator of query graph 154, such as query result 162, for example. Cluster 115, in embodiments, may comprise further node sets that are associated with characteristics other than a cache type or computation type. In another example, cluster 115 may also include node set(s) of one type. Node sets of the same or different type or characteristic may exist in cluster 115. Note that although the variable "N" is used with reference to compute nodes 120A-120N and 122A-122N, it is to be understood that first node set 114A and second node set 114B may have different numbers of compute nodes, and their respective compute nodes may be scaled up and down in different numbers and in different rates by cluster scaler 208, as further described elsewhere herein.

A particular workload may be represented as a hypergraph comprising a collection of query graphs. The query graphs comprise query operators to be executed on compute nodes by query processor 112. Each operator of the hypergraph may be assigned for execution to a cluster view comprising compute nodes.

Figure 6:
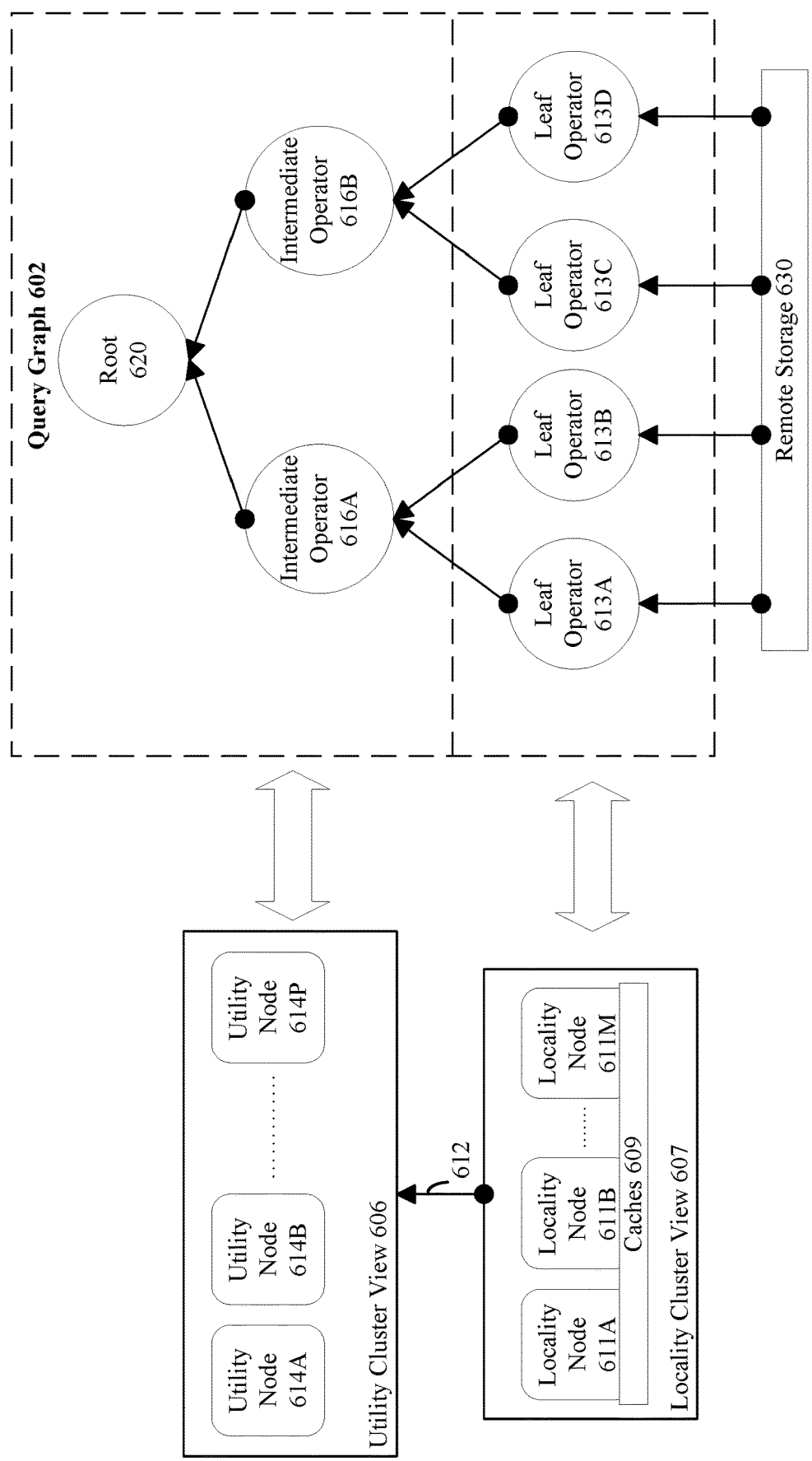
FIG. 6 illustrates compute nodes disposed in utility and locality views in a cluster configuration and in a query graph configuration, in accordance with an embodiment.

For instance, FIG. 6 illustrates compute nodes represented according to utility and locality views in a cluster configuration (left half of FIG. 6) and in a query graph configuration (right half of FIG. 6), in accordance with an embodiment. In particular, FIG. 6 shows a query graph 602 associated with remote storage 630, and a utility cluster view 606 and a locality cluster view 607. FIG. 6 is provided to illustrate a relationship between cluster views and a query graph. In particular, FIG. 6 shows how the various operators in a query graph may be assigned for execution to compute nodes in cluster views based on their characteristics. FIG. 6 is further described as follows.

Locality cluster view 607 and utility cluster view 606 are embodiments of first node set 114A and second node set 114B in cluster 115. Utility cluster view 606 includes nodes 614A. 614B, and 614P (collectively referred to as "utility nodes 614A-614P"). Locality cluster view 607 includes caches 609 and nodes 611A, 611B, and 611M (collectively referred to as "locality nodes 611A-611M"). Operators that execute in locality cluster view 607, which are typically scan operators, may be scheduled in locality cluster view 607. These scan operators produce node results 612 that are received by utility cluster view 606 for use in the execution of further operators.

Query graph 602 of FIG. 6 represents a single query graph or a hypergraph of multiple user queries in query graph form. Query graph 602 is an example embodiment of query graph 154 and remote storage 630 is an embodiment of storage system 124 of FIG. 1. As shown in FIG. 6, query graph 602 includes root 620, intermediate operators 616A and 616B (collectively referred to as "intermediate operators 616A-616B"), and leaf operators 613A, 613B, 613C, and 613D (collectively referred to as "leaf operators 613A-613D"), which are shown interconnected by arrows representing dependencies. Query graph 602 may include fewer or greater numbers of operators than shown in FIG. 6, in any suitable configuration of dependencies. Leaf operators 613A-613D include operations to process data received from remote storage 630, where data eligible for processing is stored. The data is distributed amongst leaf operators 613A-613D. Intermediate operators 616A-616B (i.e., parent operators of leaf operators 613A-613D) receive the processed data (i.e., output from child operators, leaf operators 613A-613D) as input. Root 620 is the root operator of query graph 602 and receives intermediate operator results generated by intermediate operators 616A-616B to then generate a query result, such as query result 162.

Thus, query graph 602 and utility and locality cluster views 606 and 607. Leaf operators 613A-613D, which tend to be scan operations that are cache intensive, are executed in nodes 611A-611M of locality cluster view 607. Furthermore, intermediate and root operators 616A-616B and 620, which tend to be computationally intensive, are executed in modes 614A-614P of utility cluster view 606. As demand changes, such as by the execution of leaf and/or intermediate operators completing, and/or further of such operators needing to be executed, query processor 112 is configured to balance cache preservation and compute growth for utility cluster view 606 and locality cluster view 607 accordingly.

V. Example Computing Device Embodiments

As noted herein, the embodiments described, along with any circuits, components and/or subcomponents thereof, as well as the flowcharts/flow diagrams described herein, including portions thereof, and/or other embodiments, may be implemented in hardware, or hardware with any combination of software and/or firmware, including implementation as computer program code configured to be executed in one or more processors and stored in a computer readable storage medium, or implementation as hardware logic/electrical circuitry, such as implementation together in a system-on-chip (SoC), a field programmable gate array (FPGA), and/or an application specific integrated circuit (ASIC). A SOC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 7:
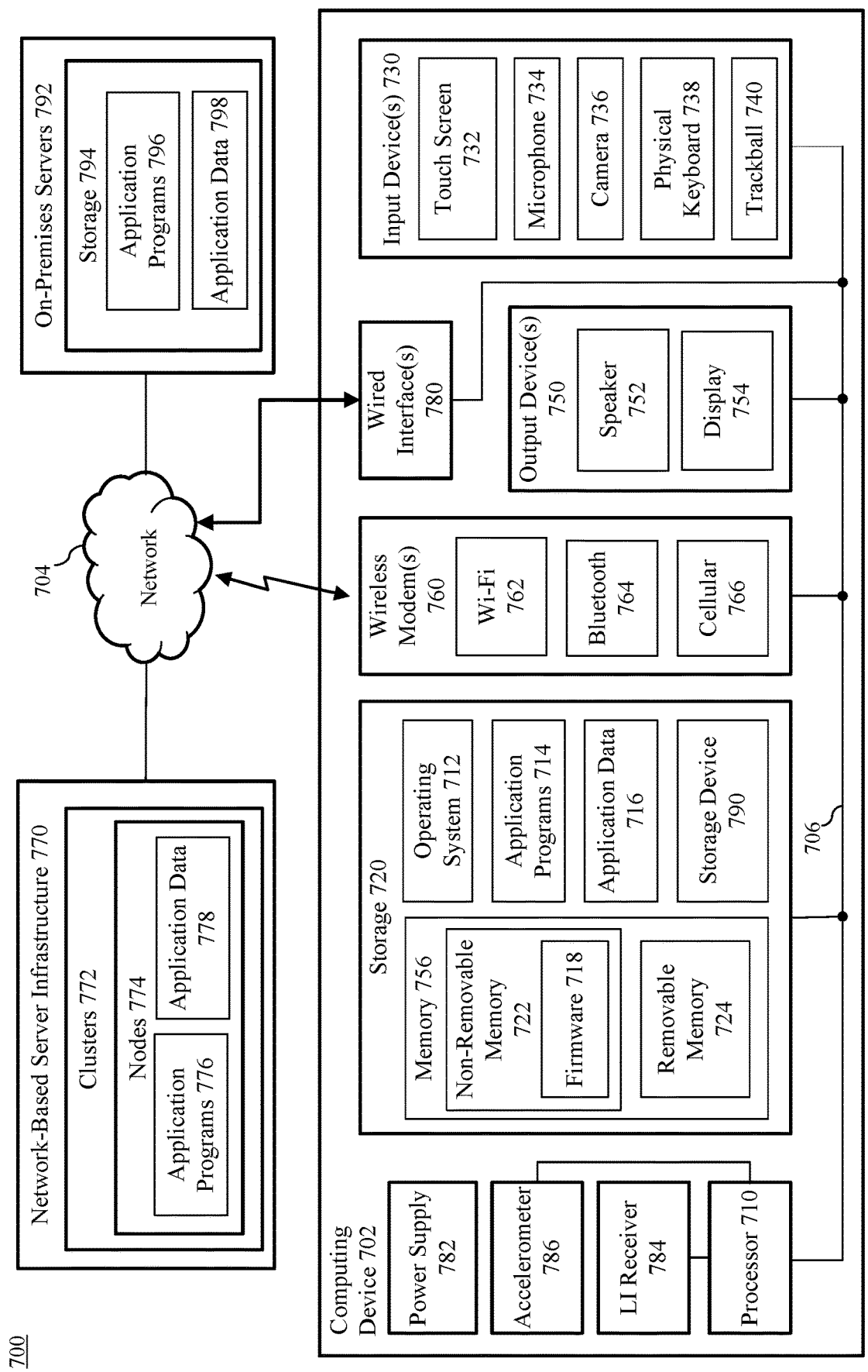
FIG. 7 shows a block diagram of an example computer system in which embodiments may be implemented.

Embodiments disclosed herein may be implemented in one or more computing devices that may be mobile (a mobile device) and/or stationary (a stationary device) and may include any combination of the features of such mobile and stationary computing devices. Examples of computing devices in which embodiments may be implemented are described as follows with respect to FIG. 7. FIG. 7 shows a block diagram of an exemplary computing environment 700 that includes a computing device 702. Computing devices 102A-102N, storage system 124, and nodes 120A-120N, 122A-122N, 614A-614P, and 611A-611M may each include one or more of the components of computing device 702. In some embodiments, computing device 702 is communicatively coupled with devices (not shown in FIG. 7) external to computing environment 700 via network 704. Network 704 is an example of network 106 of FIG. 1. Network 704 comprises one or more networks such as local area networks (LANs), wide area networks (WANs), enterprise networks, the Internet, etc., and may include one or more wired and/or wireless portions. Network 704 may additionally or alternatively include a cellular network for cellular communications. Computing device 702 is described in detail as follows.

Computing device 702 can be any of a variety of types of computing devices. For example, computing device 702 may be a mobile computing device such as a handheld computer (e.g., a personal digital assistant (PDA)), a laptop computer, a tablet computer (such as an Apple iPad™), a hybrid device, a notebook computer (e.g., a Google Chromebook™ by Google LLC), a netbook, a mobile phone (e.g., a cell phone, a smart phone such as an Apple® iPhone® by Apple Inc., a phone implementing the Google® Android™ operating system, etc.), a wearable computing device (e.g., a head-mounted augmented reality and/or virtual reality device including smart glasses such as Google® Glass™, Oculus Rift® of Facebook Technologies, LLC, etc.), or other type of mobile computing device. Computing device 702 may alternatively be a stationary computing device such as a desktop computer, a personal computer (PC), a stationary server device, a minicomputer, a mainframe, a supercomputer, etc.

As shown in FIG. 7, computing device 702 includes a variety of hardware and software components, including a processor 710, a storage 720, one or more input devices 730, one or more output devices 750, one or more wireless modems 760, one or more wired interfaces 780, a power supply 782, a location information (LI) receiver 784, and an accelerometer 786. Storage 720 includes memory 756, which includes non-removable memory 722 and removable memory 724, and a storage device 790. Storage 720 also stores an operating system 712, application programs 714, and application data 716. Wireless modem(s) 760 include a Wi-Fi modem 762, a Bluetooth modem 764, and a cellular modem 766. Output device(s) 750 includes a speaker 752 and a display 754. Input device(s) 730 includes a touch screen 732, a microphone 734, a camera 736, a physical keyboard 738, and a trackball 740. Not all components of computing device 702 shown in FIG. 7 are present in all embodiments, additional components not shown may be present, and any combination of the components may be present in a particular embodiment. These components of computing device 702 are described as follows.

A single processor 710 (e.g., central processing unit (CPU), microcontroller, a microprocessor, signal processor, ASIC (application specific integrated circuit), and/or other physical hardware processor circuit) or multiple processors 710 may be present in computing device 702 for performing such tasks as program execution, signal coding, data processing, input/output processing, power control, and/or other functions. Processor 710 may be a single-core or multi-core processor, and each processor core may be single-threaded or multithreaded (to provide multiple threads of execution concurrently). Processor 710 is configured to execute program code stored in a computer readable medium, such as program code of operating system 712 and application programs 714 stored in storage 720. Operating system 712 controls the allocation and usage of the components of computing device 702 and provides support for one or more application programs 714 (also referred to as "applications" or "apps"). Application programs 714 may include common computing applications (e.g., e-mail applications, calendars, contact managers, web browsers, messaging applications), further computing applications (e.g., word processing applications, mapping applications, media player applications, productivity suite applications), one or more machine learning (ML) models, as well as applications related to the embodiments disclosed elsewhere herein.

Any component in computing device 702 can communicate with any other component according to function, although not all connections are shown for case of illustration. For instance, as shown in FIG. 7, bus 706 is a multiple signal line communication medium (e.g., conductive traces in silicon, metal traces along a motherboard, wires, etc.) that may be present to communicatively couple processor 710 to various other components of computing device 702, although in other embodiments, an alternative bus, further buses, and/or one or more individual signal lines may be present to communicatively couple components. Bus 706 represents one or more of any of several types of bus structures, including a memory bus or memory controller, a peripheral bus, an accelerated graphics port, and a processor or local bus using any of a variety of bus architectures.

Storage 720 is physical storage that includes one or both of memory 756 and storage device 790, which store operating system 712, application programs 714, and application data 716 according to any distribution. Non-removable memory 722 includes one or more of RAM (random access memory), ROM (read only memory), flash memory, a solid-state drive (SSD), a hard disk drive (e.g., a disk drive for reading from and writing to a hard disk), and/or other physical memory device type. Non-removable memory 722 may include main memory and may be separate from or fabricated in a same integrated circuit as processor 710. As shown in FIG. 7, non-removable memory 722 stores firmware 718, which may be present to provide low-level control of hardware. Examples of firmware 718 include BIOS (Basic Input/Output System, such as on personal computers) and boot firmware (e.g., on smart phones). Removable memory 724 may be inserted into a receptacle of or otherwise coupled to computing device 702 and can be removed by a user from computing device 702. Removable memory 724 can include any suitable removable memory device type, including an SD (Secure Digital) card, a Subscriber Identity Module (SIM) card, which is well known in GSM (Global System for Mobile Communications) communication systems, and/or other removable physical memory device type. One or more of storage device 790 may be present that are internal and/or external to a housing of computing device 702 and may or may not be removable. Examples of storage device 790 include a hard disk drive, a SSD, a thumb drive (e.g., a USB (Universal Serial Bus) flash drive), or other physical storage device.

One or more programs may be stored in storage 720. Such programs include operating system 712, one or more application programs 714, and other program modules and program data. Examples of such application programs may include, for example, computer program logic (e.g., computer program code/instructions) for implementing one or more of management service 108, entity specific service endpoint 116, and node pool 130, along with any components and/or subcomponents thereof, as well as the flowcharts/flow diagrams (e.g., flowcharts 300, 400, 410, 420) described herein, including portions thereof, and/or further examples described herein.

Storage 720 also stores data used and/or generated by operating system 712 and application programs 714 as application data 716. Examples of application data 716 include web pages, text, images, tables, sound files, video data, and other data, which may also be sent to and/or received from one or more network servers or other devices via one or more wired or wireless networks. Storage 720 can be used to store further data including a subscriber identifier, such as an International Mobile Subscriber Identity (IMSI), and an equipment identifier, such as an International Mobile Equipment Identifier (IMEI). Such identifiers can be transmitted to a network server to identify users and equipment.

A user may enter commands and information into computing device 702 through one or more input devices 730 and may receive information from computing device 702 through one or more output devices 750. Input device(s) 730 may include one or more of touch screen 732, microphone 734, camera 736, physical keyboard 738 and/or trackball 740 and output device(s) 750 may include one or more of speaker 752 and display 754. Each of input device(s) 730 and output device(s) 750 may be integral to computing device 702 (e.g., built into a housing of computing device 702) or external to computing device 702 (e.g., communicatively coupled wired or wirelessly to computing device 702 via wired interface(s) 780 and/or wireless modem(s) 760). Further input devices 730 (not shown) can include a Natural User Interface (NUI), a pointing device (computer mouse), a joystick, a video game controller, a scanner, a touch pad, a stylus pen, a voice recognition system to receive voice input, a gesture recognition system to receive gesture input, or the like. Other possible output devices (not shown) can include piezoelectric or other haptic output devices. Some devices can serve more than one input/output function. For instance, display 754 may display information, as well as operating as touch screen 732 by receiving user commands and/or other information (e.g., by touch, finger gestures, virtual keyboard, etc.) as a user interface. Any number of each type of input device(s) 730 and output device(s) 750 may be present, including multiple microphones 734, multiple cameras 736, multiple speakers 752, and/or multiple displays 754.

One or more wireless modems 760 can be coupled to antenna(s) (not shown) of computing device 702 and can support two-way communications between processor 710 and devices external to computing device 702 through network 704, as would be understood to persons skilled in the relevant art(s). Wireless modem 760 is shown generically and can include a cellular modem 766 for communicating with one or more cellular networks, such as a GSM network for data and voice communications within a single cellular network, between cellular networks, or between the mobile device and a public switched telephone network (PSTN). Wireless modem 760 may also or alternatively include other radio-based modem types, such as a Bluetooth modem 764 (also referred to as a "Bluetooth device") and/or Wi-Fi 762 modem (also referred to as an "wireless adaptor"). Wi-Fi modem 762 is configured to communicate with an access point or other remote Wi-Fi-capable device according to one or more of the wireless network protocols based on the IEEE (Institute of Electrical and Electronics Engineers) 802.11 family of standards, commonly used for local area networking of devices and Internet access. Bluetooth modem 764 is configured to communicate with another Bluetooth-capable device according to the Bluetooth short-range wireless technology standard(s) such as IEEE 802.15.1 and/or managed by the Bluetooth Special Interest Group (SIG).

Computing device 702 can further include power supply 782, LI receiver 784, accelerometer 786, and/or one or more wired interfaces 780. Example wired interfaces 780 include a USB port, IEEE 1394 (Fire Wire) port, a RS-232 port, an HDMI (High-Definition Multimedia Interface) port (e.g., for connection to an external display), a DisplayPort port (e.g., for connection to an external display), an audio port, an Ethernet port, and/or an Apple® Lightning® port, the purposes and functions of each of which are well known to persons skilled in the relevant art(s). Wired interface(s) 780 of computing device 702 provide for wired connections between computing device 702 and network 704, or between computing device 702 and one or more devices/peripherals when such devices/peripherals are external to computing device 702 (e.g., a pointing device, display 754, speaker 752, camera 736, physical keyboard 738, etc.). Power supply 782 is configured to supply power to each of the components of computing device 702 and may receive power from a battery internal to computing device 702, and/or from a power cord plugged into a power port of computing device 702 (e.g., a USB port, an A/C power port).

LI receiver 784 may be used for location determination of computing device 702 and may include a satellite navigation receiver such as a Global Positioning System (GPS) receiver or may include other type of location determiner configured to determine location of computing device 702 based on received information (e.g., using cell tower triangulation, etc.). Accelerometer 786 may be present to determine an orientation of computing device 702.

Note that the illustrated components of computing device 702 are not required or all-inclusive, and fewer or greater numbers of components may be present as would be recognized by one skilled in the art. For example, computing device 702 may also include one or more of a gyroscope, barometer, proximity sensor, ambient light sensor, digital compass, etc. Processor 710 and memory 756 may be co-located in a same semiconductor device package, such as included together in an integrated circuit chip, FPGA, or system-on-chip (SOC), optionally along with further components of computing device 702.

In embodiments, computing device 702 is configured to implement any of the above-described features of flowcharts herein. Computer program logic for performing any of the operations, steps, and/or functions described herein may be stored in storage 720 and executed by processor 710.

In some embodiments, server infrastructure 770 may be present in computing environment 700 and may be communicatively coupled with computing device 702 via network 704. Server infrastructure 770, when present, may be a network-accessible server set (e.g., a cloud-based environment or platform). As shown in FIG. 7, server infrastructure 770 includes clusters 772. Each of clusters 772 may comprise a group of one or more compute nodes and/or a group of one or more storage nodes. For example, as shown in FIG. 7, cluster 772 includes nodes 774. Nodes 774 are accessible via network 704 (e.g., in a "cloud-based" embodiment) to build, deploy, and manage applications and services, including the execution of multi-query analytics workloads against a distributed database. Any of nodes 774 may be a storage node that comprises a plurality of physical storage disks, SSDs, and/or other physical storage devices that are accessible via network 704 and are configured to store data associated with the applications and services managed by nodes 774. For example, as shown in FIG. 7, nodes 774 may store application data 778.

Each of nodes 774 may, as a compute node, comprise one or more server computers, server systems, and/or computing devices. For instance, a node 774 may include one or more of the components of computing device 702 disclosed herein. Each of nodes 774 may be configured to execute one or more software applications (or "applications") and/or services and/or manage hardware resources (e.g., processors, memory, etc.), which may be utilized by users (e.g., customers) of the network-accessible server set. For example, as shown in FIG. 7, nodes 774 may operate application programs 776. In an implementation, a node of nodes 774 may operate or comprise one or more virtual machines, with each virtual machine emulating a system architecture (e.g., an operating system), in an isolated manner, upon which applications such as application programs 776 may be executed.

In an embodiment, one or more of clusters 772 may be co-located (e.g., housed in one or more nearby buildings with associated components such as backup power supplies, redundant data communications, environmental controls, etc.) to form a datacenter, or may be arranged in other manners. Accordingly, in an embodiment, one or more of clusters 772 may be a datacenter in a distributed collection of datacenters. In embodiments, exemplary computing environment 700 comprises part of a cloud-based platform such as Amazon Web Services® of Amazon Web Services, Inc., or Google Cloud Platform™ of Google LLC, although these are only examples and are not intended to be limiting.

In an embodiment, computing device 702 may access application programs 776 for execution in any manner, such as by a client application and/or a browser at computing device 702. Example browsers include Microsoft Edge® by Microsoft Corp. of Redmond, Washington, Mozilla Firefox®, by Mozilla Corp. of Mountain View, California, Safari®, by Apple Inc. of Cupertino, California, and Google® Chrome by Google LLC of Mountain View, California.

For purposes of network (e.g., cloud) backup and data security, computing device 702 may additionally and/or alternatively synchronize copies of application programs 714 and/or application data 716 to be stored at network-based server infrastructure 770 as application programs 776 and/or application data 778. For instance, operating system 712 and/or application programs 714 may include a file hosting service client, such as Microsoft® OneDrive® by Microsoft® Corporation, Amazon Simple Storage Service (Amazon S3)® by Amazon Web Services, Inc., Dropbox® by Dropbox, Inc., Google Drive™ by Google LLC, etc., configured to synchronize applications and/or data stored in storage 720 at network-based server infrastructure 770.

In some embodiments, on-premises servers 792 may be present in computing environment 700 and may be communicatively coupled with computing device 702 via network 704. On-premises servers 792, when present, are hosted within the infrastructure of an organization and, in many cases, physically onsite of a facility of that organization. On-premises servers 792 are controlled, administered, and maintained by IT (Information Technology) personnel of the organization or an IT partner to the organization. Application data 798 may be shared by on-premises servers 792 between computing devices of the organization, including computing device 702 (when part of an organization) through a local network of the organization, and/or through further networks accessible to the organization (including the Internet). Furthermore, on-premises servers 792 may serve applications such as application programs 796 to the computing devices of the organization, including computing device 702. Accordingly, on-premises servers 792 may include storage 794 (which includes one or more physical storage devices such as storage disks and/or SSDs) for storage of application programs 796 and application data 798 and may include one or more processors for execution of application programs 796. Still further, computing device 702 may be configured to synchronize copies of application programs 714 and/or application data 716 for backup storage at on-premises servers 792 as application programs 796 and/or application data 798.

Embodiments described herein may be implemented in one or more of computing device 702, network-based server infrastructure 770, and on-premises servers 792. For example, in some embodiments, computing device 702 may be used to implement systems, clients, or devices, or components/subcomponents thereof, disclosed elsewhere herein. In other embodiments, a combination of computing device 702, network-based server infrastructure 770, and/or on-premises servers 792 may be used to implement the systems, clients, or devices, or components/subcomponents thereof, disclosed elsewhere herein.

As used herein, the terms "computer program medium," "computer-readable medium," and "computer-readable storage medium," etc., are used to refer to physical hardware media. Examples of such physical hardware media include any hard disk, optical disk, SSD, other physical hardware media such as RAMs, ROMs, flash memory, digital video disks, zip disks, MEMs (microelectronic machine) memory, nanotechnology-based storage devices, and further types of physical/tangible hardware storage media of storage 720. Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared, and other wireless media, as well as wired media. Embodiments are also directed to such communication media that are separate and non-overlapping with embodiments directed to computer-readable storage media.

As noted above, computer programs and modules (including application programs 714) may be stored in storage 720. Such computer programs may also be received via wired interface(s) 780 and/or wireless modem(s) 760 over network 704. Such computer programs, when executed or loaded by an application, enable computing device 702 to implement features of embodiments discussed herein. Accordingly, such computer programs represent controllers of the computing device 702.

Embodiments are also directed to computer program products comprising computer code or instructions stored on any computer-readable medium or computer-readable storage medium. Such computer program products include the physical storage of storage 720 as well as further physical storage types.

VI. Additional Example Embodiments

In one embodiment, a method comprises: receiving a graph of operators representative of a user query, the graph of operators including at least a first operator; determining the first operator to have a first characteristic; assigning the first operator to a first node set of a plurality of node sets, the first node set associated with the first characteristic, a second node set of the plurality of node sets associated with a second characteristic different from the first characteristic; and causing the first operator to be executed in the assigned first node set to generate a first operator result; and a query result to be generated based at least on the first operator result.

In one implementation of the method, said determining of the method further comprises: determining each operator in a workload to have an associated characteristic, the workload including a plurality of graphs of operators that includes the graph of operators; wherein said assigning further comprises: assigning each operator in the workload to a node set of the plurality of node sets based on the associated characteristic; and wherein said causing further comprises: causing the operators of the workload to be executed in the assigned node set to generate a plurality of operator results that includes the first operator result; and causing a plurality of query results corresponding to the plurality of graphs of operators to be generated based at least on the plurality of operator results.

In one implementation of the method, the first characteristic is one of: a cache preservation characteristic; or a computation intensive characteristic associated with node sets that are more aggressively scalable than node sets of the cache preservation characteristic.

In one implementation of the method, the first operator is a scan operator and the first characteristic is a cache preservation characteristic, the method further comprising: increasing a number of compute nodes of the first node set to accommodate at least one of: storage of objects scanned by executing the scan operator; or execution of the scan operator; and decreasing the number of compute nodes of the first node set after: completion of execution of the scan operator; and expiry of a local cache policy of the first node set.

In one implementation of the method, the first characteristic is a computation intensive characteristic, the method further comprising: increasing a number of compute nodes of the first node set to accommodate execution of the first operator; and decreasing the number of compute nodes of the first node set after completion of the execution of the first operator.

In one implementation of the method, the first operator is a scan operator and the first characteristic is a cache preservation characteristic, the method further comprising: determining a first parallelism attribute associated with the scan operator; causing the scan operator to be executed over a number of compute nodes of the first node set corresponding to the first parallelism attribute to: read a dataset by the scan operator; and transform the dataset into output data; and causing the output data to be consumed over a number of dependent operators of the scan operator, the dependent operators associated with the second characteristic, the second characteristic being a computation intensive characteristic.

In one implementation of the method, the plurality of node sets further comprises a third node set associated with at least one of the following system tasks: garbage collection; backup; or index builds.

In another embodiment, a system comprises: a processor; a memory device that stores program code structured to cause the processor to: receive a graph of operators representative of a user query, the graph of operators including at least a first operator; determine the first operator to have a first characteristic; assign the first operator to a first node set of a plurality of node sets, the first node set associated with the first characteristic. a second node set of the plurality of node sets associated with a second characteristic different from the first characteristic; and cause the first operator to be executed in the assigned first node set to generate a first operator result; and a query result to be generated based at least on the first operator result.

In one implementation of the system, to determine the first operator to have a first characteristic, the program code is further structured to cause the processor to: determine each operator in a workload to have an associated characteristic, the workload including a plurality of graphs of operators that includes the graph of operators; wherein, to assign the first operator to the first node set, the program code is further structured to cause the processor to: assign each operator in the workload to a node set of the plurality of node sets based on the associated characteristic; and wherein the program code is further structured to cause the processor to: cause the operators of the workload to be executed in the assigned node set to generate a plurality of operator results that includes the first operator result; and cause a plurality of query results corresponding to the plurality of graphs of operators to be generated based at least on the plurality of operator results.

In one implementation of the system, the first characteristic is one of: a cache preservation characteristic; or a computation intensive characteristic associated with node sets that are more aggressively scalable than node sets of the cache preservation characteristic.

In one implementation of the system, the first operator is a scan operator, the first characteristic is a cache preservation characteristic, and the program code further structured to cause the processor to: increase a number of compute nodes of the first node set to accommodate at least one of: storage of objects scanned by executing the scan operator; or execution of the scan operator; and decrease the number of compute nodes of the first node set after: completion of execution of the scan operator; and expiry of a local cache policy of the first node set.

In one implementation of the system, the program code further structured to cause the processor to: increase a number of compute nodes of the second type node cluster to accommodate the execution of the second operator; and decrease the number of compute nodes of the second type node cluster after completion of the execution of the second operator.

In one implementation of the system, the first characteristic is a computation intensive characteristic and the program code is further structured to cause the processor to: increase a number of compute nodes of the first node set to accommodate execution of the first operator; and decrease the number of compute nodes of the first node set after completion of the execution of the first operator.

In one implementation of the system, the first operator is a scan operator, the first characteristic is a cache preservation characteristic, and the program code is further structured to cause the processor to: determine a first parallelism attribute associated with the scan operator; cause the scan operator to be executed over a number of compute nodes of the first node set corresponding to the first parallelism attribute to: read a dataset by the scan operator; and transform the dataset into output data; and cause the output data to be consumed over a number of dependent operators of the scan operator, the dependent operators associated with the second characteristic, the second characteristic being a computation intensive characteristic.

In a further embodiment, a system comprises: a processor; a memory device that stores program code to be executed by the processor, the program code comprising: an operator analyzer configured to: determine a first operator of a graph of operators to have a first characteristic; and assign the first operator to a first node set of a plurality of node sets, the first node set associated with the first characteristic, a second node set of the plurality of node sets associated with a second characteristic different from the first characteristic; and an operator scheduler configured to cause: the first operator to be executed in the assigned first node set to generate a first operator result; and a query result to be generated based at least on the first operator result.

In one implementation of the system, the operator analyzer is further configured to: determine each operator in a workload to have an associated characteristic, the workload including a plurality of graphs of operators that includes the graph of operators; and assign each operator in the workload to a node set of the plurality of node sets based on the associated characteristic; and wherein the operator scheduler is further configured to: cause the operators of the workload to be executed in the assigned node set to generate a plurality of operator results that includes the first operator result; and cause a plurality of query results corresponding to the plurality of graphs of operators to be generated based at least on the plurality of operator results.

In one implementation of the system, the first characteristic is one of: a cache preservation characteristic; or a computation intensive characteristic associated with node sets that are more aggressively scalable than node sets of the cache preservation characteristic.

In one implementation of the system the first operator is a scan operator and the first characteristic is a cache preservation characteristic, the system further comprising: a cluster view manager configured to: cause an increase in a number of compute nodes of the first node set to accommodate at least one of: storage of objects scanned by executing the scan operator; or execution of the scan operator; and cause a decrease in the number of compute nodes of the first node set after: completion of execution of the scan operator; and expiry of a local cache policy of the first node set.

In one implementation of the system, the first characteristic is a computation intensive characteristic, further comprising: a cluster view manager configured to: cause an increase in a number of compute nodes of the first node set to accommodate execution of the first operator; and cause a decrease in the number of compute nodes of the first node set after completion of the execution of the first operator.

In one implementation of the system, wherein the first operator is a scan operator and the first characteristic is a cache preservation characteristic, the system further comprising a query optimizer configured to: determine a first parallelism attribute associated with the scan operator; and wherein the operator scheduler is further configured to: cause the scan operator to be executed over a number of compute nodes of the first node set corresponding to the first parallelism attribute to: read a dataset by the scan operator; and transform the dataset into output data; and cause the output data to be consumed over a number of dependent operators of the scan operator, the dependent operators associated with the second characteristic, the second characteristic being a computation intensive characteristic.

VII. Conclusion

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the discussion, unless otherwise stated, adjectives modifying a condition or relationship characteristic of a feature or features of an implementation of the disclosure, should be understood to mean that the condition or characteristic is defined to within tolerances that are acceptable for operation of the implementation for an application for which it is intended. Furthermore, if the performance of an operation is described herein as "in response to" one or more factors, it is to be understood that the one or more factors may be regarded as a sole contributing factor for causing the operation to occur or a contributing factor along with one or more additional factors for causing the operation to occur, and that the operation may occur at any time upon or after establishment of the one or more factors. Still further, where "based on" is used to indicate an effect as a result of an indicated cause, it is to be understood that the effect is not required to only result from the indicated cause, but that any number of possible additional causes may also contribute to the effect. Thus, as used herein, the term "based on" should be understood to be equivalent to the term "based at least on."

Numerous example embodiments have been described above. Any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Furthermore, example embodiments have been described above with respect to one or more running examples. Such running examples describe one or more particular implementations of the example embodiments; however, embodiments described herein are not limited to these particular implementations.

Several types of impactful operations have been described herein; however, lists of impactful operations may include other operations, such as, but not limited to, accessing enablement operations, creating and/or activating new (or previously-used) user accounts, creating and/or activating new subscriptions, changing attributes of a user or user group, changing multi-factor authentication settings, modifying federation settings, changing data protection (e.g., encryption) settings, elevating the privileges of another user account (e.g., via an admin account), retriggering guest invitation e-mails, and/or other operations that impact the cloud-base system, an application associated with the cloud-based system, and/or a user (e.g., a user account) associated with the cloud-based system.

Moreover, according to the described embodiments and techniques, any components of systems, computing devices, servers, device management services, virtual machine provisioners, applications, and/or data stores and their functions may be caused to be activated for operation/performance thereof based on other operations, functions, actions, and/or the like, including initialization, completion, and/or performance of the operations, functions, actions, and/or the like.

In some example embodiments, one or more of the operations of the flowcharts described herein may not be performed. Moreover, operations in addition to or in lieu of the operations of the flowcharts described herein may be performed. Further, in some example embodiments, one or more of the operations of the flowcharts described herein may be performed out of order, in an alternate sequence, or partially (or completely) concurrently with each other or with other operations.

The embodiments described herein and/or any further systems, sub-systems, devices and/or components disclosed herein may be implemented in hardware (e.g., hardware logic/electrical circuitry), or any combination of hardware with software (computer program code configured to be executed in one or more processors or processing devices) and/or firmware.

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described example embodiments, but should be defined only in accordance with the following claims and their equivalents.

What is claimed is:

1. A system, comprising:
a processor;
a memory device that stores program code structured to cause the processor to:
generate a graph of operators from a user query, the graph of operators including operators of the user query represented as vertices and including edges representative of dependencies among the operators, the graph of operators including at least a first operator representative of a first vertex of the user query;
determine the first operator to have a first characteristic, the first characteristic being a cache preservation characteristic;
assign the first operator to a first node set of a plurality of node sets, the first node set associated with the first characteristic, a second node set of the plurality of node sets associated with a second characteristic different from the cache preservation characteristic, a number of nodes in the first node set more stable than a number of nodes in the second node set; and
cause:
the first operator to be executed in the assigned first node set to generate a first operator result; and
a query result to be generated based at least on the first operator result.

2. The system of claim 1, wherein, to determine the first operator to have a first characteristic, the program code is further structured to cause the processor to:
determine each operator in a workload to have an associated characteristic, the workload including a plurality of graphs of operators that includes the graph of operators;
wherein, to assign the first operator to the first node set, the program code is further structured to cause the processor to:
assign each operator in the workload to a node set of the plurality of node sets based on the associated characteristic; and
wherein the program code is further structured to cause the processor to:
cause each operator of the workload to be executed in the assigned node set to generate a plurality of operator results that includes the first operator result; and
cause a plurality of query results corresponding to the plurality of graphs of operators to be generated based at least on the plurality of operator results.

3. The system of claim 1, wherein the second characteristic is a computation intensive characteristic associated with node sets that are more aggressively scalable than node sets of the cache preservation characteristic.

4. The system of claim 1, wherein the first operator is a scan operator, the program code further structured to cause the processor to:
increase a number of compute nodes of the first node set to accommodate at least one of:
storage of objects scanned by executing the scan operator; or
execution of the scan operator; and
decrease the number of compute nodes of the first node set after:
completion of execution of the scan operator; and
expiry of a local cache policy of the first node set.

5. The system of claim 3, wherein the program code is further structured to cause the processor to:
increase a number of compute nodes of the first node set to accommodate execution of a second operator having the second characteristic; and
decrease the number of compute nodes of the second node set after completion of the execution of the second operator.

6. The system of claim 1, wherein the first operator is a scan operator, the program code further structured to cause the processor to:
determine a first parallelism attribute associated with the scan operator;
cause the scan operator to be executed over a number of compute nodes of the first node set corresponding to the first parallelism attribute to:
read a dataset by the scan operator; and
transform the dataset into output data; and
cause the output data to be consumed over a number of dependent operators of the scan operator, the dependent operators associated with the second characteristic, the second characteristic being a computation intensive characteristic.

7. The system of claim 1, wherein the plurality of node sets further comprises a third node set associated with at least one of the following system tasks:
garbage collection;
backup; or
index builds.

8. A system, comprising:
a processor;
a memory device that stores program code to be executed by the processor, the program code comprising:
an operator analyzer configured to:
determine a first operator of a graph of operators to have a first characteristic, wherein the first operator is a scan operator and the first characteristic is a cache preservation characteristic; and
assign the first operator to a first node set of a plurality of node sets, the first node set associated with the first characteristic, a second node set of the plurality of node sets associated with a second characteristic different from the first characteristic, a number of compute nodes in the first node set more stable than a number of compute nodes in the second node set; and
an operator scheduler configured to cause:
the first operator to be executed in the assigned first node set to generate a first operator result; and
a query result to be generated based at least on the first operator result.

9. The system of claim 8, wherein the operator analyzer is further configured to:
determine each operator in a workload to have an associated characteristic, the workload including a plurality of graphs of operators that includes the graph of operators; and
assign each operator in the workload to a node set of the plurality of node sets based on the associated characteristic; and
wherein the operator scheduler is further configured to cause:

each operator of the workload to be executed in the assigned node set to generate a plurality of operator results that includes the first operator result; and
a plurality of query results corresponding to the plurality of graphs of operators to be generated based at least on the plurality of operator results.

10. The system of claim 8, wherein the second characteristic is a computation intensive characteristic associated with node sets that are more aggressively scalable than node sets of the cache preservation characteristic.

11. The system of claim 8, further comprising:
a cluster view manager configured to:
cause an increase in the number of compute nodes of the first node set to accommodate at least one of:
storage of objects scanned by executing the scan operator; or
execution of the scan operator; and
cause a decrease in the number of compute nodes of the first node set after:
completion of execution of the scan operator; and
expiry of a local cache policy of the first node set.

12. The system of claim 8, wherein the second characteristic is a computation intensive characteristic, further comprising:
a cluster view manager configured to:
cause an increase in the number of compute nodes of a second node set associated with the second characteristic to accommodate execution of a second operator having the second characteristic; and
cause a decrease in the number of compute nodes of the second node set after completion of the execution of the second operator.

13. The system of claim 8, further comprising:
a query optimizer configured to:
determine a first parallelism attribute associated with the scan operator; and
wherein the operator scheduler is further configured to cause:
the scan operator to be executed over a number of compute nodes of the first node set corresponding to the first parallelism attribute to:
read a dataset by the scan operator, and
transform the dataset into output data; and
the output data to be consumed over a number of dependent operators of the scan operator, the dependent operators associated with the second characteristic, the second characteristic being a computation intensive characteristic.

14. A method, comprising:
receiving a graph of operators representative of a user query, the graph of operators including at least a first operator that is a scan operator;
determining the first operator to have a first characteristic that is a cache preservation characteristic;
determining a first parallelism attribute associated with the scan operator;
assigning the first operator to a first node set of a plurality of node sets, the first node set associated with the first characteristic, a second node set of the plurality of node sets associated with a second characteristic different from the first characteristic, a number of compute nodes in the first node set more stable than a number of compute nodes in the second node set; and
causing
the first operator to be executed in the assigned first node set to generate a first operator result, the scan operator executed over a number of compute nodes of the first node set corresponding to the first parallelism attribute, and
a query result to be generated based at least on the first operator result.

15. The method of claim 14, wherein said determining further comprises:
determining each operator in a workload to have an associated characteristic, the workload including a plurality of graphs of operators that includes the graph of operators;
wherein said assigning further comprises:
assigning each operator in the workload to a node set of the plurality of node sets based on the associated characteristic; and
wherein said causing further comprises:
causing each operator of the workload to be executed in the assigned node set to generate a plurality of operator results that includes the first operator result; and
causing a plurality of query results corresponding to the plurality of graphs of operators to be generated based at least on the plurality of operator results.

16. The method of claim 14, wherein the second characteristic is a computation intensive characteristic associated with node sets that are more aggressively scalable than node sets of the cache preservation characteristic.

17. The method of claim 14, the method further comprising:
increasing the number of compute nodes of the first node set to accommodate at least one of:
storage of objects scanned by executing the scan operator; or
execution of the scan operator; and
decreasing the number of compute nodes of the first node set after:
completion of execution of the scan operator; and
expiry of a local cache policy of the first node set.

18. The method of claim 14, wherein the second characteristic is a computation intensive characteristic, the method further comprising:
increasing the number of compute nodes of a second node set associated with the second characteristic to accommodate execution of a second operator having the second characteristic; and
decreasing the number of compute nodes of the second node set after completion of the execution of the second operator.

19. The method of claim 14, wherein causing the first operator to be executed comprises causing the scan operator to be executed over a number of compute nodes of the first node set corresponding to the first parallelism attribute to:
read a dataset by the scan operator; and
transform the dataset into output data; and
the method further comprising:
causing the output data to be consumed over a number of dependent operators of the scan operator, the dependent operators associated with the second characteristic, the second characteristic being a computation intensive characteristic.

20. The method of claim 14, wherein the plurality of node sets further comprises a third node set associated with at least one of the following system tasks:
garbage collection;
backup; or
index builds.

* * * * *